United States Patent
Fukushi et al.

(10) Patent No.: US 10,196,702 B2
(45) Date of Patent: Feb. 5, 2019

(54) ELECTRIC RESISTANCE WELDED STEEL PIPE FOR OIL WELL

(71) Applicant: NIPPON STEEL & SUMITOMO METAL CORPORATION, Tokyo (JP)

(72) Inventors: Takaaki Fukushi, Tokyo (JP); Hideki Hamatani, Tokyo (JP); Masakazu Ozaki, Tokyo (JP); Yuusuke Ichinose, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 337 days.

(21) Appl. No.: 15/023,564

(22) PCT Filed: Dec. 11, 2014

(86) PCT No.: PCT/JP2014/082898
§ 371 (c)(1),
(2) Date: Mar. 21, 2016

(87) PCT Pub. No.: WO2015/098556
PCT Pub. Date: Jul. 2, 2015

(65) Prior Publication Data
US 2016/0230241 A1 Aug. 11, 2016

(30) Foreign Application Priority Data
Dec. 25, 2013 (JP) ................................. 2013-267314

(51) Int. Cl.
*C22C 38/02* (2006.01)
*C22C 38/04* (2006.01)
(Continued)

(52) U.S. Cl.
CPC ................ *C21D 9/08* (2013.01); *B23K 11/00* (2013.01); *B23K 11/0873* (2013.01);
(Continued)

(58) Field of Classification Search
None
See application file for complete search history.

(56) References Cited

U.S. PATENT DOCUMENTS

2005/0217768 A1 10/2005 Asahi et al.
2009/0297872 A1* 12/2009 Takahashi ............... B21C 37/08
428/586
(Continued)

FOREIGN PATENT DOCUMENTS

CN 103069020 A 4/2013
EP 1860204 A1 11/2007
(Continued)

OTHER PUBLICATIONS

Machine English translation of JP 2006-144037, Shinohara Yasuhiro et al., Nov. 16, 2004.*
(Continued)

*Primary Examiner* — Deborah Yee
(74) *Attorney, Agent, or Firm* — Birch, Stewart, Kolasch & Birch, LLP

(57) ABSTRACT

An electric resistance welded steel pipe for an oil well includes in terms of mass %: 0.02 to 0.14% of C, 0.05 to 0.50% of Si, 1.0 to 2.1% of Mn, 0.020% or less of P, 0.010% or less of S, 0.010 to 0.100% of Nb, 0.010 to 0.050% of Ti, 0.010 to 0.100% of Al, and 0.0100% or less of N. Contents of Cu, Ni, Cr, Mo, V, and B are 0 to 0.50%, 0 to 1.00%, 0 to 0.50%, 0 to 0.30%, 0 to 0.10%, and 0 to 0.0030%, respectively. Remainder consisting of Fe and unavoidable impurities. In a case that a full thickness specimen is subjected to a pipe axis direction tensile test, a tensile strength is 780 MPa or more, 0.2% proof stress/tensile strength is 0.80 or more, and 2% flow stress/tensile strength is from 0.85 to 0.98.

19 Claims, 7 Drawing Sheets

(51) Int. Cl.

| | |
|---|---|
| *C22C 38/14* | (2006.01) |
| *C22C 38/12* | (2006.01) |
| *C22C 38/06* | (2006.01) |
| *C21D 9/08* | (2006.01) |
| *B23K 11/00* | (2006.01) |
| *B23K 13/00* | (2006.01) |
| *B23K 11/08* | (2006.01) |
| *C21D 8/10* | (2006.01) |
| *C21D 9/50* | (2006.01) |
| *C22C 38/00* | (2006.01) |
| *C22C 38/58* | (2006.01) |
| *B23K 11/087* | (2006.01) |
| *C22C 38/08* | (2006.01) |
| *C22C 38/20* | (2006.01) |
| *C22C 38/24* | (2006.01) |
| *C22C 38/28* | (2006.01) |
| *C22C 38/42* | (2006.01) |
| *C22C 38/44* | (2006.01) |
| *C22C 38/48* | (2006.01) |
| *C22C 38/50* | (2006.01) |
| *C22C 38/54* | (2006.01) |
| *C22C 38/60* | (2006.01) |
| *B23K 101/10* | (2006.01) |
| *B23K 103/04* | (2006.01) |
| *B21C 37/08* | (2006.01) |

(52) U.S. Cl.
CPC ............... *B23K 13/00* (2013.01); *C21D 8/10* (2013.01); *C21D 8/105* (2013.01); *C21D 9/50* (2013.01); *C21D 9/505* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/20* (2013.01); *C22C 38/24* (2013.01); *C22C 38/28* (2013.01); *C22C 38/42* (2013.01); *C22C 38/44* (2013.01); *C22C 38/48* (2013.01); *C22C 38/50* (2013.01); *C22C 38/54* (2013.01); *C22C 38/58* (2013.01); *C22C 38/60* (2013.01); *B21C 37/08* (2013.01); *B23K 2101/10* (2018.08); *B23K 2103/04* (2018.08)

(56) References Cited

U.S. PATENT DOCUMENTS

| | | | |
|---|---|---|---|
| 2009/0320965 | A1* | 12/2009 | Tsuru .................. B21C 37/065 148/521 |
| 2010/0065166 | A1 | 3/2010 | Kondo et al. |
| 2011/0186188 | A1 | 8/2011 | Kondo et al. |
| 2013/0092280 | A1 | 4/2013 | Sawamura et al. |

FOREIGN PATENT DOCUMENTS

| | | | |
|---|---|---|---|
| EP | 2634271 | A1 | 9/2013 |
| EP | 2 692 875 | A1 | 2/2014 |
| EP | 2799575 | A1 | 11/2014 |
| JP | 59-177322 | A | 10/1984 |
| JP | 60-187664 | A | 9/1985 |
| JP | 2006-144037 | A | 6/2006 |
| JP | 2006-289482 | A | 10/2006 |
| JP | 4072009 | B2 | 4/2008 |
| JP | 2011-177720 | A | 9/2011 |
| JP | 5131411 | B2 | 1/2013 |
| JP | 2013-213283 | A | 10/2013 |
| KR | 10-2013-0048796 | A | 5/2013 |
| WO | WO 2004/001076 | A1 | 12/2003 |
| WO | WO 2009/057390 | A1 | 5/2009 |
| WO | WO 2013/099192 | A1 | 7/2013 |

OTHER PUBLICATIONS

Extended European Search Report for corresponding European Application No. 14875170.4, dated May 17, 2017.
Korean Office Action and English translation, dated Mar. 16, 2017, for corresponding Korean Application No. 10-2016-7007940.
Chinese Office Action and Search Report, dated Oct. 10, 2016, for Chinese Application No. 201480050973.4, with partial English translation.
Korean Office Action, dated Sep. 8, 2017, for corresponding Korean Application No. 10-2016-7007940, with an English translation.
International Search Report, issued in PCT/JP2014/082898, dated Mar. 10, 2015.
Journal of the Japan Society for Technology of Plasticity (journal of JSTP), vol. 30, No. 338 (Mar. 1989), pp. 385-390, total 11 pages.
Written Opinion of the International Searching Authority, issued in PCT/JP2014/082898 (PCT/ISA/237), dated Mar. 10, 2015.

* cited by examiner

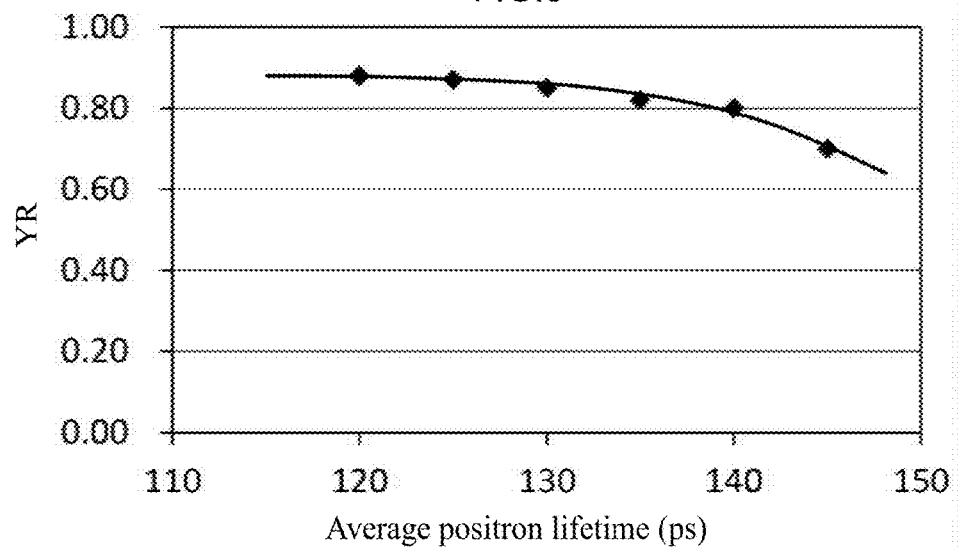
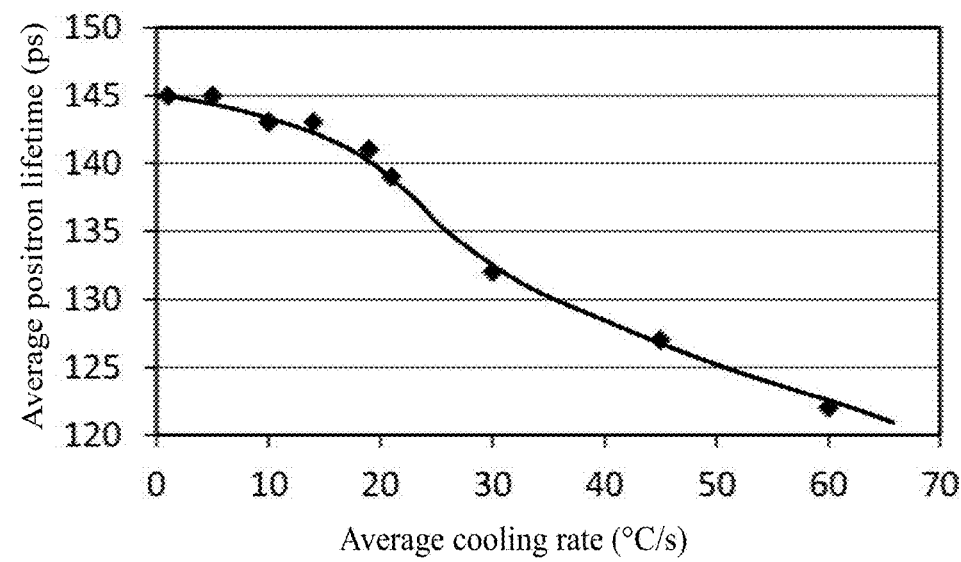

ELECTRIC RESISTANCE WELDED STEEL PIPE FOR OIL WELL

TECHNICAL FIELD

The present invention relates to an electric resistance welded steel pipe for an oil well.

BACKGROUND ART

One of properties demanded for oil well pipes is collapse strength for preventing the oil well pipes from being broken even deep in the ground. The collapse strength is measured in terms of collapse pressure.

It has been known that in an electric resistance welded steel pipe used as an oil well pipe (hereinafter also referred to as "electric resistance welded steel pipe for oil well"), a collapse strength is increased with decreasing the ratio (D/t) of an outer diameter (D) to a wall thickness (t), increased with increasing a yield strength (YS), increased with decreasing a residual stress (a residual stress generated in the pipe in a step carried out in a cold forming condition, such as forming or sizing of the electric resistance welded steel pipe), and increased with increasing excellence in roundness and thickness deviation, (see, for example, Non Patent Document 1).

As techniques for the purpose of enhancing the collapse strength of an electric resistance welded steel pipe for an oil well, a technique of making the pipe, and then performing heat treatment at low temperature to increase the yield strength utilizing the Cottrell effect, thereby enhancing the collapse strength (see, for example, Patent Document 1), and a technique of making a pipe, and then performing heat treatment at high temperature to remove residual stress, thereby enhancing the collapse strength (see, for example, Patent Document 2) are disclosed.

A technique of adjusting the chemical composition, yield stress (yield strength), tensile strength, and yield ratio of an electric resistance welded steel pipe for an oil well into specific ranges, respectively, whereby the strength and toughness of the pipe are improved without performing heat treatment after pipe making, has been known (see, for example, Patent Document 3).

Patent Document 1: Japanese Patent Application Laid-Open (JP-A) No. S60-187664
Patent Document 2: JP-A No. S59-177322
Patent Document 3: Japanese Patent No. 5131411
Non Patent Document 1: Journal of the Japan Society for Technology of Plasticity (journal of JSTP), Vol. 30, No. 338 (1989-3)

SUMMARY OF INVENTION

Technical Problem

However, it has been demanded to further improve the collapse strengths of the electric resistance welded steel pipes for an oil well described in Patent Documents 1 to 3. For further improving the collapse strength of electric resistance welded steel pipes for an oil well, improvement in collapse strength by heat treatment after pipe making is considered to be effective.

The invention was made under such circumstances with an object of providing an electric resistance welded steel pipe for an oil well which is improved in collapse strength by heat treatment after pipe making.

Solution to Problem

As a result of diligent study, the inventors found that such problems can be solved by adjusting a chemical composition, a tensile strength, the ratio of a 0.2% proof stress to the tensile strength [0.2% proof stress/tensile strength], and the ratio of a 2% flow stress to the tensile strength [2% flow stress/tensile strength] into specific ranges, respectively, thereby accomplishing the invention.

Namely, specific means for solving such problems are as follows.

<1> An electric resistance welded steel pipe for an oil well, comprising in terms of mass %:
0.02 to 0.14% of C,
0.05 to 0.50% of Si,
1.0 to 2.1% of Mn,
0.020% or less of P,
0.010% or less of S,
0.010 to 0.100% of Nb,
0.010 to 0.050% of Ti,
0.010 to 0.100% of Al, and
0.0100% or less of N,
wherein contents of Cu, Ni, Cr, Mo, V, and B are
0 to 0.50% of Cu,
0 to 1.00% of Ni,
0 to 0.50% of Cr,
0 to 0.30% of Mo,
0 to 0.10% of V, and
0 to 0.0030% of B, respectively,
a remainder consisting of Fe and unavoidable impurities,
and wherein in a case in which a full thickness specimen is subjected to a pipe axis direction tensile test, a tensile strength is 780 MPa or more, a ratio of a 0.2% proof stress to the tensile strength [0.2% proof stress/tensile strength] is 0.80 or more, and a ratio of a 2% flow stress to the tensile strength [2% flow stress/tensile strength] is from 0.85 to 0.98.

<2> The electric resistance welded steel pipe for an oil well according to <1>, comprising, in terms of mass %, one or more of:
more than 0 but equal to or less than 0.0050% of Ca,
more than 0 but equal to or less than 0.30% of Mo,
more than 0 but equal to or less than 0.10% of V,
more than 0 but equal to or less than 0.50% of Cr,
more than 0 but equal to or less than 1.00% of Ni,
more than 0 but equal to or less than 0.50% of Cu,
more than 0 but equal to or less than 0.0030% of B, and
more than 0 but equal to or less than 0.0050% of Ce.

<3> The electric resistance welded steel pipe for an oil well according to <1> or <2>, wherein a residual stress measured by a Crampton method is 300 MPa or less.

<4> The electric resistance welded steel pipe for an oil well according to any one of <1> to <3>, wherein a weld crack sensitivity composition Pcm defined by the following Formula (1) is 0.1800 or more:

$$Pcm = C + Si/30 + Mn/20 + Cu/20 + Ni/60 + Cr/20 + Mo/15 + V/10 + 5B \quad \text{Formula (1):}$$

wherein, in Formula (1), each of C, Si, Mn, Cu, Ni, Cr, Mo, V, and B shows a content (mass %) of each element].

<5> The electric resistance welded steel pipe for an oil well according to any one of <1> to <4>, wherein an average positron lifetime measured by a positron annihilation method is from 120 ps to 140 ps.

<6> The electric resistance welded steel pipe for an oil well according to any one of <1> to <5>, wherein 50% or more of prior austenite grains observed in a cross section parallel to a pipe axis direction and a wall thickness direction are prior austenite grains having an aspect ratio of 1.5 or more.

<7> The electric resistance welded steel pipe for an oil well according to any one of <1> to <6>, wherein a base metal toughness in a circumferential direction of the pipe, determined by subjecting a full size specimen with a V-notch to a Charpy impact test, is 30 J or more at 0° C.

Advantageous Effects of Invention

According to the invention, an electric resistance welded steel pipe for an oil well which is improved in collapse strength by heat treatment after pipe making can be provided.

BRIEF DESCRIPTION OF DRAWINGS

FIG. 6 is a graph illustrating an example of the relationship between an average positron lifetime and a ratio [0.2% proof stress/tensile strength] (YR).

FIG. 7 is a graph illustrating an example of the relationship between an average cooling rate and an average positron lifetime in a hot-rolling step.

DESCRIPTION OF EMBODIMENTS

Figure 1:
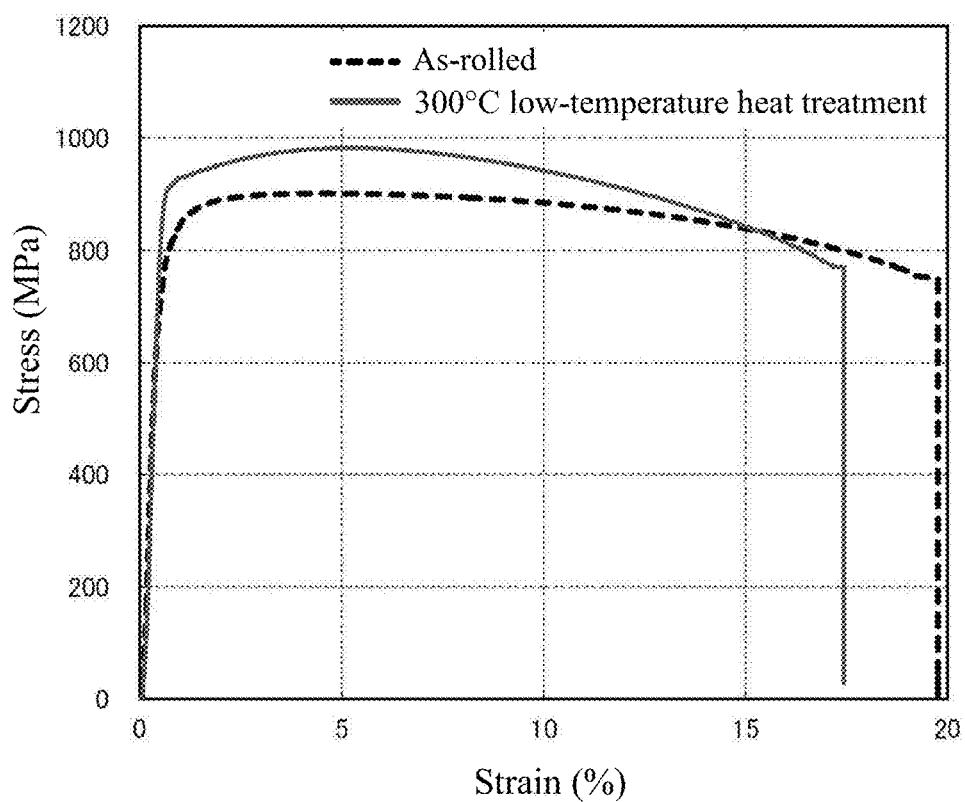
FIG. 1 illustrates a continuous line ("300° C. low-temperature heat treatment") showing the stress-strain curve of an electric resistance welded steel pipe subjected to heat treatment at 300° C. for 300 seconds after pipe making, which is an example of the embodiment, and a broken line ("as-rolled") showing a stress-strain curve prior to the heat treatment after pipe making in the example.

An embodiment of the invention will be described below.

A numerical range expressed by "x to y" herein includes the values of x and y in the range as the minimum and maximum values, respectively.

The content of a component (element) expressed by "%" herein means "mass %".

The content of C (carbon) may be herein occasionally expressed as "C content". The content of another element may be expressed similarly.

An electric resistance welded steel pipe for an oil well of the embodiment (hereinafter also referred to "electric resistance welded steel pipe") contains in terms of mass %: 0.02 to 0.14% of C, 0.05 to 0.50% of Si, 1.0 to 2.1% of Mn, 0.020% or less of P, 0.010% or less of S, 0.010 to 0.100% of Nb, 0.010 to 0.050% of Ti, 0.010 to 0.100% of Al, and 0.0100% or less of N, wherein the contents of Cu, Ni, Cr, Mo, V, and B are 0 to 0.50% of Cu, 0 to 1.00% of Ni, 0 to 0.50% of Cr, 0 to 0.30% of Mo, 0 to 0.10% of V, and 0 to 0.0030% of B, respectively, a remainder consisting of Fe and unavoidable impurities, and wherein in a case in which a full thickness specimen is subjected to a pipe axis direction tensile test, a tensile strength is 780 MPa or more, the ratio of a 0.2% proof stress to the tensile strength [0.2% proof stress/tensile strength] is 0.80 or more, and the ratio of a 2% flow stress to the tensile strength [2% flow stress/tensile strength] is from 0.85 to 0.98.

The electric resistance welded steel pipe for an oil well of the embodiment is an electric resistance welded steel pipe for an oil well which is improved in collapse strength by heat treatment after pipe making (hereinafter also referred to simply as "heat treatment").

With regard to the effect of being "improved in collapse strength by heat treatment after pipe making", the electric resistance welded steel pipe for an oil well that satisfies all the conditions in the embodiment can be regarded as an electric resistance welded steel pipe for an oil well exhibiting this effect.

Furthermore, the electric resistance welded steel pipe for an oil well of the embodiment has toughness required by an oil well pipe. The electric resistance welded steel pipe for an oil well of the embodiment has, for example, a C-direction base metal toughness (0° C.), described later, of 30 J or more.

"Collapse strength" herein refers to a collapse pressure measured in conformity with "2.3 Collapse Testing Procedure" in "API BULLETIN 5C3" which is an American Petroleum Institute standard (API standard).

"Improved in collapse strength by heat treatment after pipe making" means that a ratio of the collapse strength of an electric resistance welded steel pipe after being subjected to heat treatment to the collapse strength of the electric resistance welded steel pipe before being subjected to the heat treatment [collapse strength of electric resistance welded steel pipe after heat treatment/collapse strength of electric resistance welded steel pipe before heat treatment] (hereinafter also referred to as the "collapse strength ratio") is more than 1.00 (preferably, a collapse strength ratio of 1.10 or more).

According to the embodiment, for example, a 10% or more decrease in wall thickness can be achieved because the collapse strength ratio can be enhanced to, for example, 1.10 or more. As a result, flexibility in the design of an oil well pipe can be increased, and the cost of steel materials can be reduced.

In the electric resistance welded steel pipe of the embodiment, a tensile strength is 780 MPa or more, and the ratio of a 2% flow stress to the tensile strength (TS) [2% flow stress/tensile strength] is from 0.85 to 0.98, in a case in which a full thickness specimen is subjected to a pipe axis direction tensile test.

A tensile strength of 780 MPa or more and a ratio [2% flow stress/tensile strength] of from 0.85 to 0.98 indicate an electric resistance welded steel pipe that has been subjected to the heat treatment at a comparatively low temperature (for example, from 200° C. to 400° C.) after pipe making.

The electric resistance welded steel pipe of the embodiment differs from the electric resistance welded steel pipe for an oil well described in Patent Document 3, which is not subjected to heat treatment after pipe making, in view of a ratio [2% flow stress/tensile strength] of from 0.85 to 0.98.

With regard to the temperature in the heat treatment after pipe making, the ratio [2% flow stress/tensile strength] is easily adjusted to 0.98 or less, for example, in a case in which the temperature in the heat treatment after pipe making is 200° C. or more.

For example, in a case in which the temperature in the heat treatment after pipe making is 400° C. or less, the ratio [2% flow stress/tensile strength] is easily adjusted to 0.85 or more, and the tensile strength is easily adjusted to 780 MPa or more.

According to the embodiment, due to a ratio [2% flow stress/tensile strength] of 0.85 or more, a strength (for example, tensile strength; the same applies hereafter) is improved or a deterioration of a strength is suppressed. In an electric resistance welded steel pipe having a ratio [2% flow stress/tensile strength] of less than 0.85, it can be difficult to obtain a high strength.

A ratio [2% flow stress/tensile strength] of 0.88 or more is preferable from the viewpoint of further improving a strength.

According to the embodiment, due to a ratio [2% flow stress/tensile strength] of 0.98 or less, the collapse strength ratio is enhanced. In a case in which the ratio [2% flow stress/tensile strength] is more than 0.98, the collapse strength ratio is reduced.

A ratio [2% flow stress/tensile strength] of 0.97 or less is preferable from the viewpoint of further enhancing the collapse strength ratio. Furthermore, a ratio [2% flow stress/tensile strength] of 0.95 or less is more preferable from the viewpoint of further reducing a residual stress and further enhancing the collapse strength ratio.

"2% flow stress" herein refers to a stress at a strain of 2% on a stress-strain curve (also referred to as "SS curve") obtained by subjecting a full thickness specimen to a pipe axis direction tensile test.

"Stress" and "strain" refers to a nominal stress and a nominal strain, respectively.

Herein, the pipe axis direction tensile test refers to a tensile test of a full thickness specimen conducted in conformity with JIS Z2241 (2011), under the condition that a tensile direction corresponds to a pipe axis direction. The full thickness specimen is a specimen No. 12 (arc-shaped specimen).

The electric resistance welded steel pipe of the embodiment has a tensile strength of 780 MPa or more in the case of conducting the pipe axis direction tensile test. By this, strength required for an electric resistance welded steel pipe for an oil well having a high strength can be secured.

The upper limit of the tensile strength is not particularly restricted. From the viewpoint of suppressing deterioration in toughness, the tensile strength is preferably 1100 MPa or less, and more preferably 1050 MPa or less.

The electric resistance welded steel pipe (electric resistance welded steel pipe for oil well) of the embodiment differs from an electric resistance welded steel pipe for a line pipe that is subjected to heat treatment after pipe making, in terms of a tensile strength of 780 MPa or more.

The electric resistance welded steel pipe of the embodiment has a ratio of a 0.2% proof stress to a tensile strength [0.2% proof stress/tensile strength] of 0.80 or more in the case of conducting the pipe axis direction tensile test.

According to the embodiment, due to a ratio [0.2% proof stress/tensile strength] of 0.80 or more, the collapse strength ratio is enhanced. Namely, in a case in which a ratio [0.2% proof stress/tensile strength] is less than 0.80, the collapse strength ratio is reduced.

The upper limit of the ratio [0.2% proof stress/tensile strength] is not particularly defined, and the ratio [0.2% proof stress/tensile strength] is theoretically 1.00 or less. The ratio [0.2% proof stress/tensile strength] is preferably 0.95 or less, and more preferably 0.92 or less, from the viewpoint of enhancing the collapse strength ratio.

The ratio [0.2% proof stress/tensile strength] is preferably less than the ratio [2% flow stress/tensile strength] from the viewpoint of enhancing the collapse strength ratio.

In FIG. 1, an example of the stress-strain curve of the electric resistance welded steel pipe having a chemical composition in the embodiment is illustrated.

In FIG. 1, a continuous line is the stress-strain curve ("300° C. low-temperature heat treatment") of an electric resistance welded steel pipe subjected to heat treatment at 300° C. for 300 seconds after pipe making, which is an example of the embodiment, and a broken line is a stress-strain curve ("as-rolled") prior to the heat treatment after pipe making in the example.

As illustrated in FIG. 1, a tensile strength in "300° C. low-temperature heat treatment" is increased compared to that in "as-rolled". No definite yield point is observed in both "300° C. low-temperature heat treatment" and "as-rolled", and a proportional limit is lower in "as-rolled".

In "300° C. low-temperature heat treatment", the tensile strength is 982 MPa, a ratio [0.2% proof stress/tensile strength] is 0.90, and a ratio [2% flow stress/tensile strength] is 0.95.

In "as-rolled", the tensile strength is 902 MPa, a ratio [0.2% proof stress/tensile strength] is 0.84, and a ratio [2% flow stress/tensile strength] is 0.99.

The 0.2% proof stress of the electric resistance welded steel pipe of the embodiment corresponds to the yield strength (YS) of a steel pipe having a yield point, and the ratio [0.2% proof stress/tensile strength] of the electric resistance welded steel pipe of the embodiment corresponds to the yield ratio (YR) of the steel pipe having a yield point.

Herein, the 0.2% proof stress of the electric resistance welded steel pipe of the embodiment may be occasionally referred to as "YS", and the ratio [0.2% proof stress/tensile strength] of the electric resistance welded steel pipe of the embodiment may be occasionally referred to as "YR".

Figure 2:
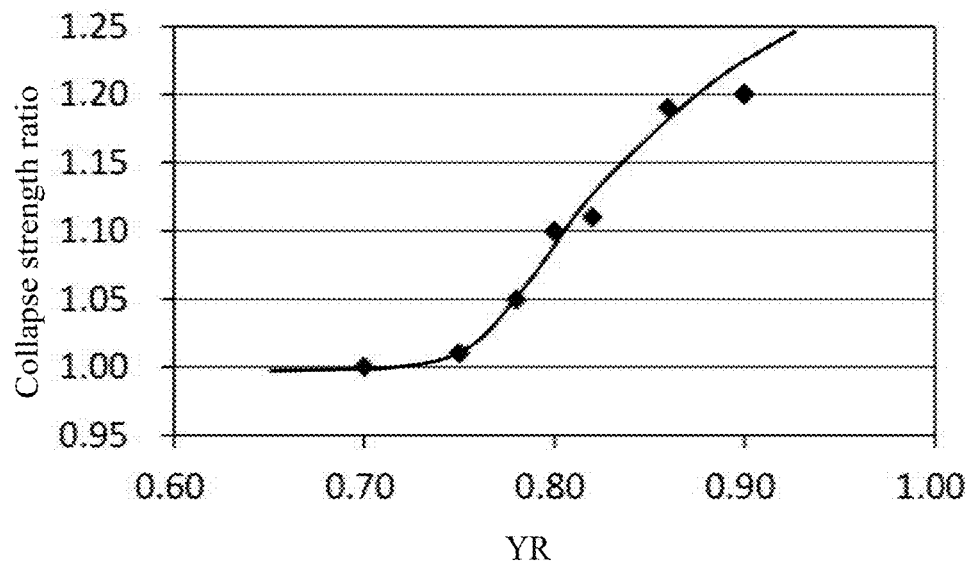
FIG. 2 is a graph illustrating an example of the relationship between a ratio [0.2% proof stress/tensile strength] (YR) and the collapse strength ratio.

FIG. 2 is a graph illustrating an example of the relationship between a ratio [0.2% proof stress/tensile strength] (YR) and the collapse strength ratio. In detail, FIG. 2 shows a variation in the collapse strength ratio in the case of varying only the ratio [0.2% proof stress/tensile strength] (YR) in an example of the electric resistance welded steel pipe of the embodiment. The horizontal axis "YR" of FIG. 2 shows the ratio [0.2% proof stress/tensile strength].

As illustrated in FIG. 2, in this example, the collapse strength ratio is 1.10 or more in a case in which the ratio [0.2% proof stress/tensile strength] (YR) is 0.80 or more.

The chemical composition of the electric resistance welded steel pipe of the embodiment will be described below.

The electric resistance welded steel pipe of the embodiment contains in terms of mass %: 0.02 to 0.14% of C, 0.05 to 0.50% of Si, 1.0 to 2.1% of Mn, 0.020% or less of P, 0.010% or less of S, 0.010 to 0.100% of Nb, 0.010 to 0.050% of Ti, 0.010 to 0.100% of Al, and 0.0100% or less of N, wherein the contents of Cu, Ni, Cr, Mo, V, and B are 0 to 0.50% of Cu, 0 to 1.00% of Ni, 0 to 0.50% of Cr, 0 to 0.30% of Mo, 0 to 0.10% of V, and 0 to 0.0030% of B, respectively, a remainder consisting of Fe and unavoidable impurities.

Each of Cu, Ni, Cr, Mo, V, and B is an optional element (selective element), and is not necessarily contained.

The electric resistance welded steel pipe of the embodiment has the chemical composition, whereby strength (for example, tensile strength) required by an oil well pipe can be secured while securing toughness (for example, C-direction base metal toughness (0° C.)) required by an oil well pipe.

<C: 0.02 to 0.14%>

C (carbon) is an element effective for securing the strength of steel.

The C content is set at 0.02% or more in order to secure the strength of steel. The C content is preferably 0.05% or more from the viewpoint of the strength.

The C content is set at 0.14% or less in order to avoid deterioration of the toughness. The C content is preferably 0.12% or less from the viewpoint of the toughness.

<Si: 0.05 to 0.50%>

Si (silicon) is an element effective as a deoxidizer.

The Si content is set at from 0.05 to 0.50% in order to secure electric resistance weldability. In both of a case in which the Si content is less than 0.05%, and a case in which the Si content is more than 0.50%, oxide defects frequently occur in an electric resistance welded portion, and such product is not available as an industrial product.

The Si content is preferably 0.10% or more. The Si content is preferably 0.40% or less.

<Mn: 1.0 to 2.1%>

Mn (manganese) is an element effective for securing the strength of steel.

The Mn content is set at 1.0% or more in order to secure the strength of steel. The Mn content is preferably 1.3% or more from the viewpoint of the strength.

The Mn content is set at 2.1% or less in order to avoid deterioration of the toughness. The Mn content is preferably 2.0% or less from the viewpoint of the toughness.

<P: 0.020% or Less>

P (phosphorus) is an unavoidable impurity element.

The P content is reduced to 0.020% or less in order to avoid deterioration of the toughness of steel.

The lower limit of the P content is not particularly defined, and the P content is preferably 0.0002% or more in consideration of the cost of dephosphorization.

<S: 0.010% or Less>

S (sulfur) is an unavoidable impurity element.

The S content is reduced to 0.010% or less in order to avoid deterioration of the toughness of steel.

The lower limit of the S content is not particularly defined, and the S content is preferably 0.0002% or more in consideration of the cost of desulfurization.

<Nb: 0.010 to 0.100%>

Nb (niobium) is an element effective for securing the strength and toughness of steel.

The Nb content is set at 0.010% or more in order to secure the strength and toughness of steel. The Nb content is preferably 0.020% or more from the viewpoint of the strength and the toughness.

The Nb content is set at 0.100% or less in order to avoid deterioration of the toughness. The Nb content is preferably 0.060% or less from the viewpoint of the toughness.

<Ti (Titanium): 0.010 to 0.050%>

Ti is an element effective for fixing N (nitrogen) to suppress strain aging and to secure toughness. Ti is further effective for suppressing cracking during continuous casting. From the viewpoint of such an effect, the Ti content is set at 0.010% or more. The Ti content is preferably 0.015% or more, and more preferably 0.020% or more, from the viewpoint of the toughness.

The Ti content is set at 0.050% or less in order to avoid a phenomenon in which coarse precipitates are generated, whereby the toughness is deteriorated. The Ti content is preferably 0.040% or less, and more preferably 0.030% or less, from the viewpoint of the toughness.

<Al: 0.010 to 0.100%>

Al (aluminum) is an element effective as a deoxidizer.

The Al content is set at 0.010% or more in order to perform deoxidation to improve the cleanliness of steel and to secure toughness. The Al content is preferably 0.020% or more, and more preferably 0.030% or more, from the viewpoint of the toughness.

The Al content is set at 0.100% or less in order to avoid a phenomenon in which coarse precipitates are generated, whereby the toughness is deteriorated. The Al content is preferably 0.090% or less, more preferably 0.080% or less, and still more preferably 0.070% or less, from the viewpoint of the toughness.

<N: 0.0100% or less>

N (nitrogen) is an unavoidable impurity element.

However, an excessively high content of N may result in excessively increased inclusions such as AlN, as a result of which a surface crack, toughness deterioration, and/or the like may occur. Thus, the upper limit of the N content is 0.0100%. The N content is preferably 0.0080% or less, more preferably 0.0060% or less, and particularly preferably 0.0050% or less.

The lower limit of the N content is not particularly defined, and the N content is preferably 0.0020% or more in consideration of the cost and economical efficiency of N removal (denitration).

Cu, Ni, Cr, Mo, V, and B which are selective elements will be described below.

<Cu: 0 to 0.50%>

Cu (copper) is an element having the effect of improving hardenability and further improving strength by solid solution strengthening. However, an excessively high content of Cu results in deterioration in the toughness of a base metal, as a result of which generation of a scratch on a hot-rolled steel plate is promoted. Thus, the upper limit of the Cu content is 0.50%. The upper limit of the Cu content is preferably 0.40%, and more preferably 0.30%.

Cu is a selective element, and is not necessarily contained. However, the Cu content is preferably 0.01% or more, and more preferably 0.03% or more from the viewpoint of more effectively obtaining the effect.

<Ni: 0 to 1.00%>

Ni (nickel) is an element having the effect of improving strength and toughness. However, Ni is an expensive element, and an excessively high content of Ni may result in deterioration in economical efficiency. Thus, the upper limit of the Ni content is 1.00%. The upper limit of the Ni content is preferably 0.50%, more preferably 0.40%, and still more preferably 0.30%.

Ni is a selective element, and is not necessarily contained. However, the Ni content is preferably 0.01% or more, more preferably 0.05% or more, and still more preferably 0.10% or more from the viewpoint of more effectively obtaining the effect.

<Cr: 0 to 0.50%>

Cr (chromium) is an element having the effect of improving hardenability and improving strength. However, an excessively high content of Cr may result in significant deterioration in electric resistance weldability. Thus, the upper limit of the Cr content is 0.50%. The upper limit of the Cr content is preferably 0.40%, more preferably 0.30%, and still more preferably 0.20%.

Cr is a selective element, and is not necessarily contained. However, the Cr content is preferably 0.01% or more, and more preferably 0.03% or more, from the viewpoint of more effectively obtaining the effect.

<Mo: 0 to 0.30%>

Mo (molybdenum) is an element having the effect of strengthening a precipitation ability and improving strength. However, Mo is an expensive element, and an excessively high content of Mo may result in deterioration in economical efficiency. Thus, the upper limit of the Mo content is 0.30%. The upper limit of the Mo content is preferably 0.20%, and more preferably 0.15%.

Mo is a selective element, and is not necessarily contained. However, the Mo content is preferably 0.01% or more, more preferably 0.05% or more, and still more preferably 0.10% or more, from the viewpoint of more effectively obtaining the effect.

<V: 0 to 0.10%>

V (vanadium) is an element having the effect of strengthening a precipitation ability and improving strength. However, the upper limit of the V content is set at 0.10% in view of a base metal toughness.

V is a selective element, and is not necessarily contained. However, the V content is preferably 0.01% or more, and more preferably 0.03% or more, from the viewpoint of more effectively obtaining the effect.

<B: 0 to 0.0030%>

B (boron) is an element having the effect of improving hardenability and improving strength. However, a B content of more than 0.0030% does not lead to further improvement of the hardenability, and can result in generation of precipitates, as a result of which the toughness can be deteriorated. Thus, the upper limit of the content of B is 0.0030%. The upper limit of the content of B is preferably 0.0025%, and more preferably 0.0020%.

B is a selective element, and is not necessarily contained. However, the B content is preferably 0.0001% or more, more preferably 0.0005% or more, and still more preferably 0.0010% or more, from the viewpoint of more effectively obtaining the effect.

<Unavoidable Impurities>

In the embodiment, an unavoidable impurity means a component contained in a source material or a component mixed into steel in a production process, and not a component contained intentionally in steel.

Specific examples of unavoidable impurities include O (oxygen), Sb (antimony), Sn (tin), W (tungsten), Co (cobalt), As (arsenic), Mg (magnesium), Pb (lead), Bi (bismuth), H (hydrogen), and REM. "REM" refers to a rare earth element, i.e., at least one element selected from the group consisting of Sc (scandium), Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), and Lu (lutetium).

Among the elements, the content of O is preferably controlled to 0.006% or less.

Ordinarily, for other elements, with respect to Sb, Sn, W, Co, and As, mix up to a content of 0.1% or less, with respect to Mg, Pb, and Bi, mix up to a content of 0.005% or less, and with respect to H, mix up to a content of 0.0004% or less are possible; however, with respect to another element, no particular control is required insofar as the content is within an ordinary range.

The electric resistance welded steel pipe of the embodiment may selectively contain one or more of more than 0 but equal to or less than 0.0050% of Ca, more than 0 but equal to or less than 0.30% of Mo, more than 0 but equal to or less than 0.10% of V, more than 0 but equal to or less than 0.50% of Cr, more than 0 but equal to or less than 1.00% of Ni, more than 0 but equal to or less than 0.50% of Cu, more than 0 but equal to or less than 0.0030% of B, and more than 0 but equal to or less than 0.0050% of Ce.

These elements may be mixed into steel as unavoidable impurities besides intentional containing in steel.

Each of the preferable contents of Mo, V, Cr, Cu, and B in the case of containing the elements is as described above.

<Ca: More than 0 but Equal to or Less than 0.0050%>

Ca (calcium) is an element having the effect of finely dispersing MnS-based inclusions, thereby increasing the cleanliness of steel. However, an excessively high content of Ca results in upsizing of oxides or sulfides, as a result of which toughness may be adversely affected. Thus, the upper limit of the content of Ca is 0.0050%. The upper limit of the content of Ca is preferably 0.0040%.

Ca is not necessarily contained. However, the Ca content is preferably 0.0005% or more, more preferably 0.0010% or more, still more preferably 0.0020% or more, and particularly preferably 0.0030% or more, from the viewpoint of more effectively obtaining the effect.

<Ce: More than 0 but Equal to or Less than 0.0050%>

Ce (cerium) is an element having the effect of increasing the cleanliness of a steel. However, an excessively high content of Ce results in generation of coarse inclusions, as a result of which the cleanliness of steel is deteriorated. Thus, the upper limit of the content of Ce is 0.0050%. The upper limit of the content of Ce is preferably 0.0040%.

Ce is not necessarily contained. However, the Ce content is preferably 0.0005% or more, and more preferably 0.0010% or more, from the viewpoint of more effectively obtaining the effect.

In the electric resistance welded steel pipe of the embodiment, examples of means for achieving a tensile strength of 780 MPa or more in the electric resistance welded steel pipe of the embodiment include a means of enhancing a weld crack sensitivity composition Pcm defined by the following Formula (1).

$$Pcm = C + Si/30 + Mn/20 + Cu/20 + Ni/60 + Cr/20 + Mo/15 + V/10 + 5B \quad \text{Formula (1):}$$

wherein, in Formula (1), each of C, Si, Mn, Cu, Ni, Cr, Mo, V, and B shows the content (mass %) of each element.

Cu, Ni, Cr, Mo, V, and B are optional elements, as described above. Namely, Cu, Ni, Cr, Mo, V, and B may be zero (0) in Formula (1).

Pcm is preferably 0.1800 or more, more preferably 0.2000 or more, and still more preferably 0.2200 or more, in view of easily achieving a tensile strength of 780 MPa or more in the electric resistance welded steel pipe.

Pcm tends to be apparently a low value in a case in which the electric resistance welded steel pipe contains B. Therefore, it is particularly preferable that Pcm is 0.1800 or more in a case in which the electric resistance welded steel pipe contains B, and Pcm is 0.2200 or more in a case in which the electric resistance welded steel pipe does not contain B.

The upper limit of Pcm is not particularly restricted, and Pcm may be, for example, 0.3000 or less, and is preferably 0.2500 or less.

Examples of means for achieving a tensile strength of 780 MPa or more include a means of decreasing a heat treatment temperature to some extent (for example, to 400° C. or less), and a means of shortening a heat treatment time to some extent (for example, to 600 seconds or less), as well as the means of enhancing Pcm.

The means for achieving a tensile strength of 780 MPa or more may be used singly, or in combination of two or more kinds thereof.

In the electric resistance welded steel pipe of the embodiment, examples of means for achieving a ratio [0.2% proof stress/tensile strength] of 0.80 or more include a means of increasing a heat treatment temperature after pipe making to some extent (for example, to 200° C. or more), and a means of prolonging a heat treatment time after pipe making to some extent (for example, to 3 seconds or more).

It is considered that each of the means can allow a ratio [0.2% proof stress/tensile strength] of 0.80 or more to be easily achieved by more effectively exerting the Cottrell effect due to fixation of a solid solution C on a dislocation during heat treatment.

Examples of means for achieving a ratio [0.2% proof stress/tensile strength] of 0.80 or more also include a means of increasing an average cooling rate in a hot-rolling step for obtaining a steel plate (for example, increasing an average cooling rate to 20° C./s or more), and a means of decreasing a coiling temperature (for example, to 100° C. or less) in a hot-rolling step.

It is considered that each of the means can allow the amount of dislocation and the amount of solid solution C to be secured by suppressing ferrite precipitation, thereby causing transformation at low temperature. Therefore, a ratio [0.2% proof stress/tensile strength] of 0.80 or more can be considered to be easily achieved by more effectively exerting the Cottrell effect due to fixation of a solid solution C on a dislocation during heat treatment.

The hot-rolling step, which is a step before pipe making, refers to a step of hot-rolling a slab, cooling the slab to make a steel plate, and coiling up the obtained steel plate to obtain a coil.

Examples of means for achieving a ratio [0.2% proof stress/tensile strength] of 0.80 or more also include a means of performing sizing in a high sizing strain amount (for example, sizing strain amount of 2.0% or more) in a pipe-making step. It is considered that this means enables a dislocation amount to be increased, thereby enabling a stable dislocation substructure (cell structure) to be formed. Therefore, a ratio [0.2% proof stress/tensile strength] of 0.80 or more is considered to be easily achieved by fixing a dislocation and a solid solution C to each other during heat treatment.

The pipe-making step refers to a step of uncoiling the steel plate from the coil obtained in the hot-rolling step, forming the unwound steel plate in a cylindrical shape (tubular shape), electric resistance welding abutting surfaces after the formation, thereby making an electric resistance welded steel pipe, and subjecting the obtained electric resistance welded steel pipe to sizing (diameter reduction working).

The means for achieving a ratio [0.2% proof stress/tensile strength] of 0.80 or more may be used singly, or in combination of two or more kinds thereof In the electric resistance welded steel pipe of the embodiment, examples of means for achieving a ratio [2% flow stress/tensile strength] of 0.98 or less include a means of increasing a heat treatment temperature to some extent (for example, to 200° C. or more), and a means of prolonging a heat treatment time to some extent (for example, to 3 seconds or more). The means may be used singly, or in combination of two or more kinds thereof.

In the electric resistance welded steel pipe of the embodiment, examples of means for achieving a ratio [2% flow stress/tensile strength] of 0.85 or more include a means of decreasing a heat treatment temperature to some extent (for example, to 400° C. or less), and a means of shortening a heat treatment time to some extent (for example, to 600 seconds or less). The means may be used singly, or in combination of two or more kinds thereof.

The electric resistance welded steel pipe of the embodiment preferably has a residual stress of 300 MPa or less, measured by a Crampton method, from the viewpoint of enhancing the collapse strength ratio (for example, viewpoint of allowing the collapse strength ratio to be 1.10 or more). The residual stress is more preferably 290 MPa or less, and still more preferably 280 MPa or less.

Because it is preferable to minimize the residual stress from the viewpoint of enhancing the collapse strength ratio, the lower limit of the residual stress is not particularly restricted. From the viewpoint of easy achievement, the residual stress is preferably 10 MPa or more, more preferably 50 MPa or more, still more preferably 100 MPa or more, and particularly preferably 160 MPa or more.

Figure 3:
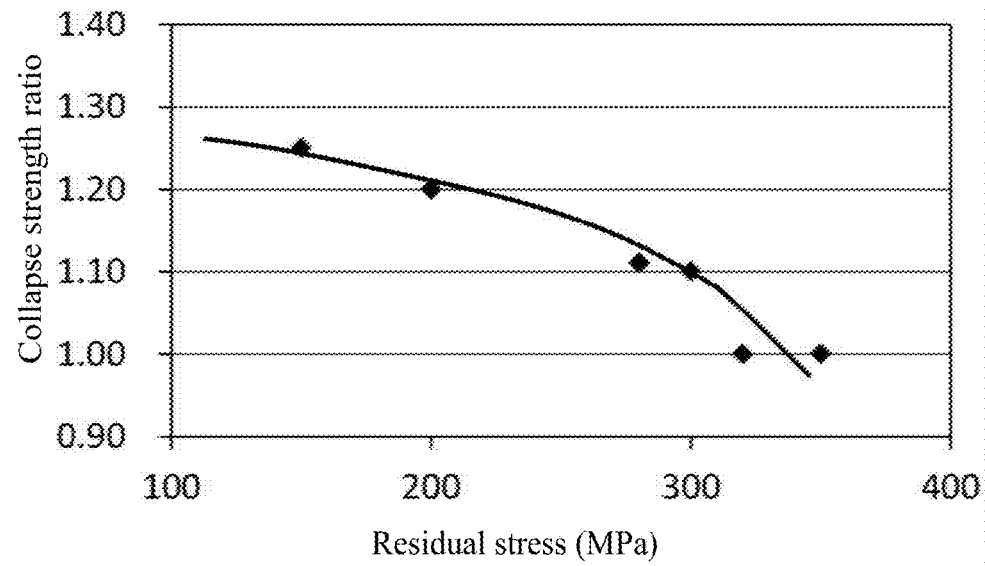
FIG. 3 is a graph illustrating an example of the relationship between a residual stress and the collapse strength ratio.

FIG. 3 is a graph illustrating an example of the relationship between a residual stress and the collapse strength ratio.

In detail, FIG. 3 shows a variation in the collapse strength ratio in the case of varying only the residual stress in an example of the embodiment.

As illustrated in FIG. 3, in this example, the collapse strength ratio is 1.10 or more in a case in which the residual stress is 300 MPa or less.

Examples of means for achieving a residual stress of 300 MPa or less include a means of increasing a heat treatment temperature to some extent (for example, to 200° C. or more), and a means of prolonging a heat treatment time to some extent (for example, to 3 seconds or more). The means may allow a dislocation to be significantly rearranged, thereby in turn effectively reducing the residual stress. The means may be used singly, or in combination of two or more kinds thereof.

Figure 4:
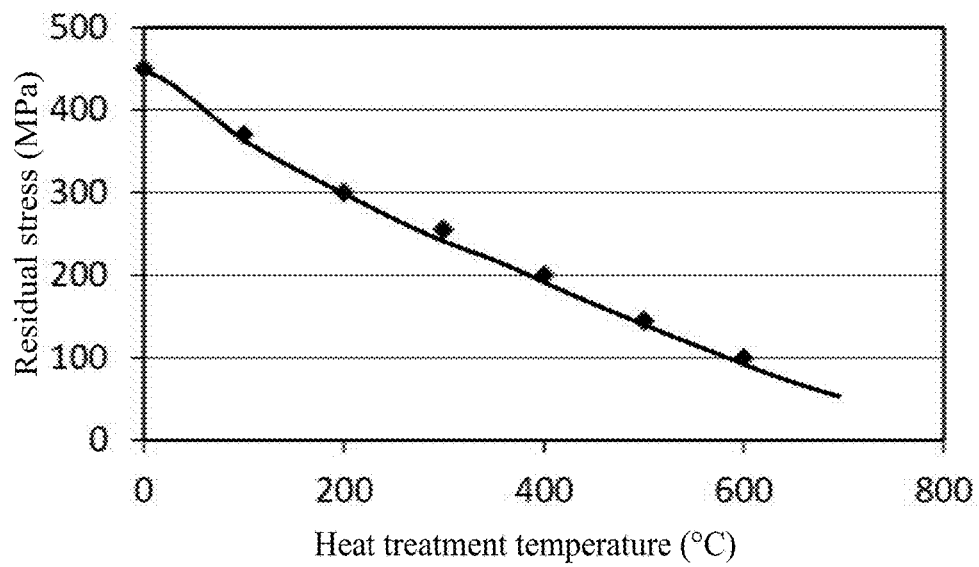
FIG. 4 is a graph illustrating an example of the relationship between a heat treatment temperature and a residual stress.

FIG. 4 is a graph illustrating an example of the relationship between a heat treatment temperature and a residual stress.

In detail, FIG. 4 shows a variation in the collapse strength ratio in a case in which the heat treatment temperature is varied in an example of the embodiment.

As illustrated in FIG. 4, in this example, the residual stress is 300 MPa or less in a case in which the heat treatment temperature is 200° C. or more.

Figure 5:
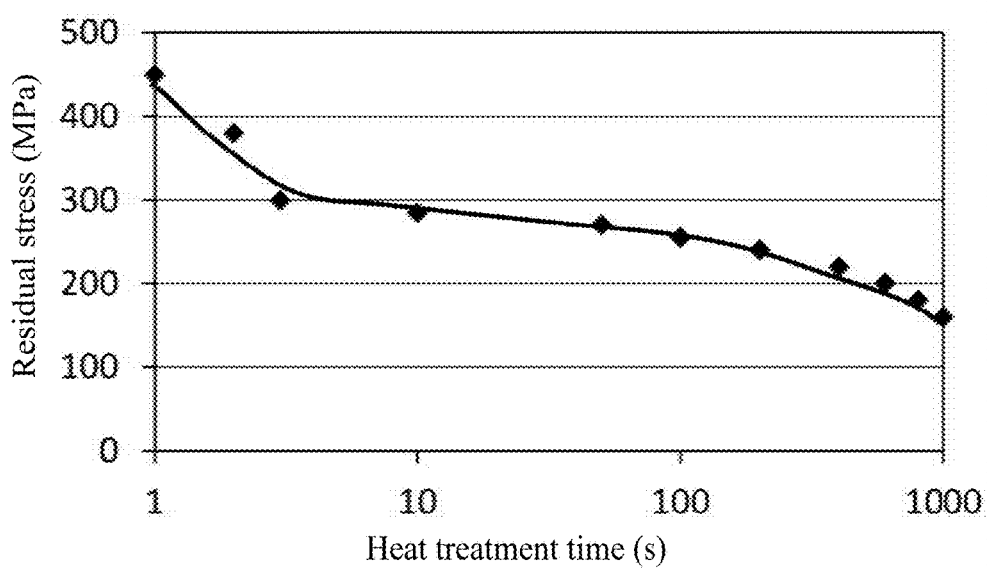
FIG. 5 is a graph illustrating an example of the relationship between a heat treatment time and a residual stress.

FIG. 5 is a graph illustrating an example of the relationship between a heat treatment time and a residual stress.

In detail, FIG. 5 shows a variation in the collapse strength ratio in a case in which the heat treatment time is varied in an example of the embodiment.

As illustrated in FIG. 5, in this example, the residual stress is 300 MPa or less in a case in which the heat treatment time is 3 seconds or more.

The electric resistance welded steel pipe of the embodiment preferably has an average positron lifetime of from 120 ps to 140 ps, measured by a positron annihilation method.

In a case in which an average positron lifetime of 120 ps or more, an achievement of a tensile strength of 780 MPa or more become easily. The reason thereof is considered to be because an average positron lifetime of 120 ps or more shows that a sufficient amount of dislocation is secured.

Further, in a case in which an average positron lifetime is from 120 ps to 140 ps, it is easier to achieve a ratio [0.2% proof stress/tensile strength] (YR) of 0.80 or more. The reason for this is thought to be because a sufficient amount of dislocation is secured, thereby temporally causing an average positron lifetime of more than 140 ps before heat treatment, and by the heat treatment, a solid solution C is sufficiently fixed to the sufficient amount of dislocation, thereby causing an average positron lifetime ranging from 120 ps to 140 ps.

A method for measuring an average positron lifetime by a positron annihilation method is common. The method is described in detail in, for example, "Positron Lifetime Method to Analyse Structural Defects, written by Prof. Yasuharu Shirai, pp. 183-189" in "Advanced Experimental Technique of Material Engineering, the Japan Institute of Metals, issued on Dec. 1, 1998, ISBN4-88903-072-7C3057".

Specifically, a $^{22}$Na radiation source is inserted into a measurement sample, and the generation and annihilation times of positive electrons emitted from the radiation source into the sample are recognized by detecting emitted γ-rays with a detector. The difference between the recognized generation and annihilation times is recognized as a positron lifetime. Signals showing various positron lifetimes are actually detected. The average value of the positron lifetimes recognized from the signals is regarded as "average positron lifetime".

FIG. 6 is a graph illustrating an example of the relationship between an average positron lifetime and a ratio [0.2% proof stress/tensile strength] (YR).

In detail, FIG. 6 shows a variation in ratio [0.2% proof stress/tensile strength] (YR) in a case in which the average positron lifetime is varied in an example of the embodiment.

As illustrated in FIG. 6, in the example, YR is 0.80 or more in a case in which the average positron lifetime is 140 ps or less.

Examples of means for achieving an average positron lifetime of 140 ps or less include a means of increasing an average cooling rate (for example, to 20° C./s or more) in the hot-rolling step, a means of decreasing a coiling temperature (for example, to 100° C. or less) in the hot-rolling step, and a means of performing sizing in a high sizing strain amount (for example, 2.0% or more) in the pipe-making step.

FIG. 7 is a graph illustrating the relationship between an average cooling rate and an average positron lifetime in the hot-rolling step.

In detail, FIG. 7 shows a variation in average positron lifetime in a case in which the average cooling rate is varied in an example of the embodiment.

As illustrated in FIG. 7, in the example, the average positron lifetime is 140 ps or less in a case in which the average cooling rate is 20° C./s or more.

Figure 8:
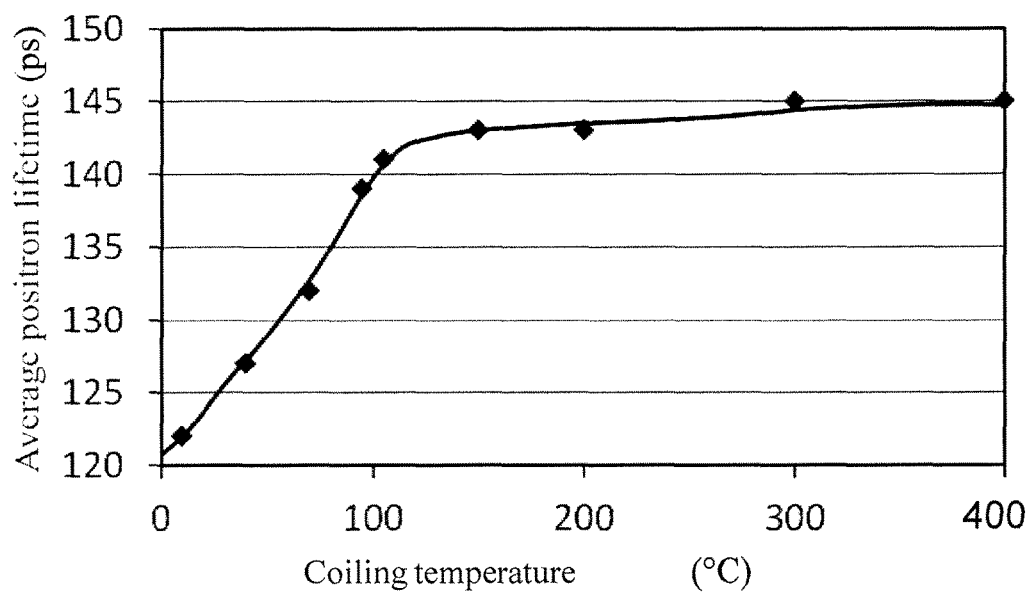
FIG. 8 is a graph illustrating an example of the relationship between a coiling temperature and an average positron lifetime in a hot-rolling step.

FIG. 8 is a graph illustrating the relationship between a coiling temperature and an average positron lifetime in the hot-rolling step.

In detail, FIG. 8 shows a variation in average positron lifetime in a case in which the coiling temperature is varied in an example of the embodiment.

As illustrated in FIG. 8, in the example, the average positron lifetime is 140 ps or less in a case in which the coiling temperature is 100° C. or less.

Figure 9:
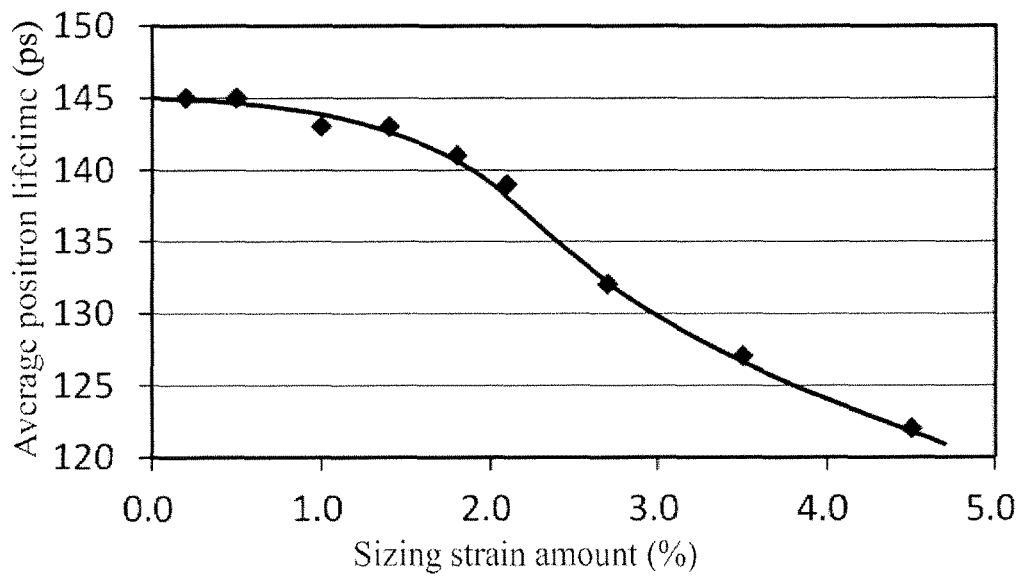
FIG. 9 is a graph illustrating an example of the relationship between a sizing strain amount and an average positron lifetime in a pipe-making step.

FIG. 9 is a graph illustrating the relationship between a sizing strain amount and an average positron lifetime in the pipe-making step.

In detail, FIG. 9 shows a variation in average positron lifetime in a case in which the sizing strain amount is varied in an example of the embodiment.

As illustrated in FIG. 9, in the example, the average positron lifetime is 140 ps or less in a case in which the sizing strain amount is 2.0% or more.

An aspect of the electric resistance welded steel pipe of the embodiment is preferably an aspect in which 50% or more of prior austenite grains (of which the number is 50% or more) observed in a cross section parallel to a pipe axis direction and a wall thickness direction (hereinafter also referred to as "L cross-section") are prior austenite grains having an aspect ratio of 1.5 or more.

The electric resistance welded steel pipe of the aspect is an electric resistance welded steel pipe that has not been subjected to quenching and tempering. In detail, in an electric resistance welded steel pipe that has been subjected to quenching and tempering, most of observed prior austenite grains are prior austenite grains having an aspect ratio of less than 1.5. Namely, in the electric resistance welded steel pipe that has been subjected to quenching and tempering, the percentage of prior austenite grains having an aspect ratio of 1.5 or more is less than 50% of the observed prior austenite grains.

Therefore, according to the electric resistance welded steel pipe of the aspect, a collapse strength ratio that is equivalent to or more favorable than that in the case of performing quenching and tempering, is obtained without quenching, which requires heating at a high temperature (for example, 900° C. or more). Thus, the electric resistance welded steel pipe of the aspect has excellent productivity and a cost merit, compared to an electric resistance welded steel pipe that is subjected to quenching and tempering.

Figure 10A:
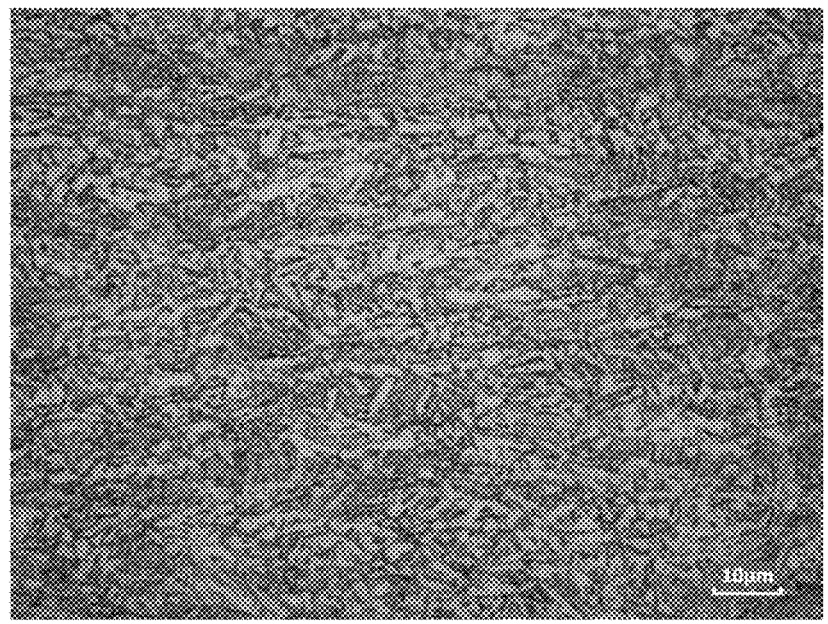
FIG. 10A is an optical microstructure photograph illustrating a part of the L cross-section (after nital etching) of an electric resistance welded steel pipe of Example 1 (heat treatment conditions: 300° C. and 300 seconds).
Figure 10B:
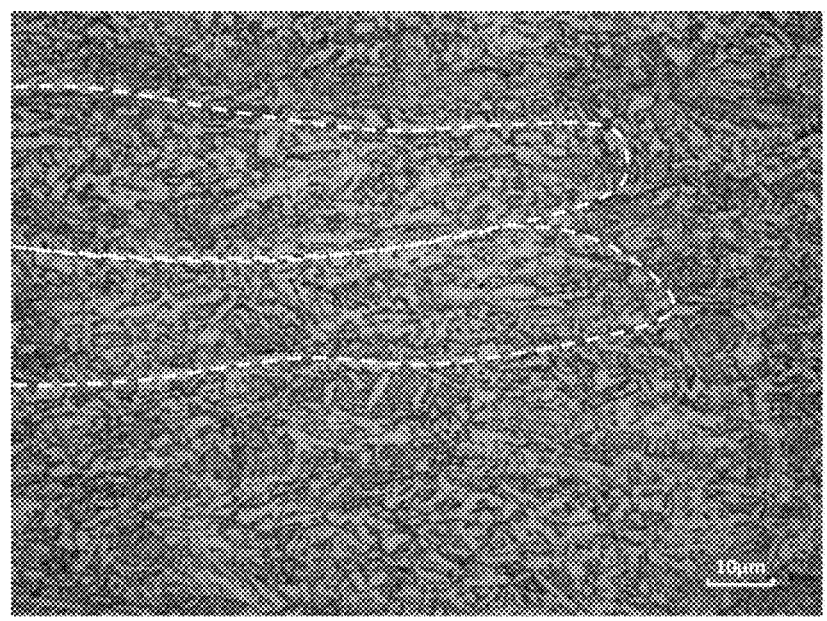
FIG. 10B is an optical microstructure photograph in which the grain boundaries of two prior austenite grains are traced with white broken lines in the optical microstructure photograph illustrated in FIG. 10A.

FIG. 10A is an optical microstructure photograph illustrating a part of the L cross-section (after nital etching) of an electric resistance welded steel pipe according to Example 1 (heat treatment conditions: 300° C. and 300 seconds) described later, and FIG. 10B is an optical microstructure photograph in which the grain boundaries of two prior austenite grains are traced with white broken lines in the optical microstructure photograph illustrated in FIG. 10A.

As illustrated in FIG. 10A and FIG. 10B, prior austenite grains having an aspect ratio of 1.5 or more are observed in the L cross-section of the electric resistance welded steel pipe of Example 1.

As illustrated in FIG. 10A and FIG. 10B, the structure of the L cross-section of the electric resistance welded steel pipe of Example 1 is a bainite-based structure which partially contains ferrite (e.g., in grain boundary of prior austenite grain).

Figure 11A:
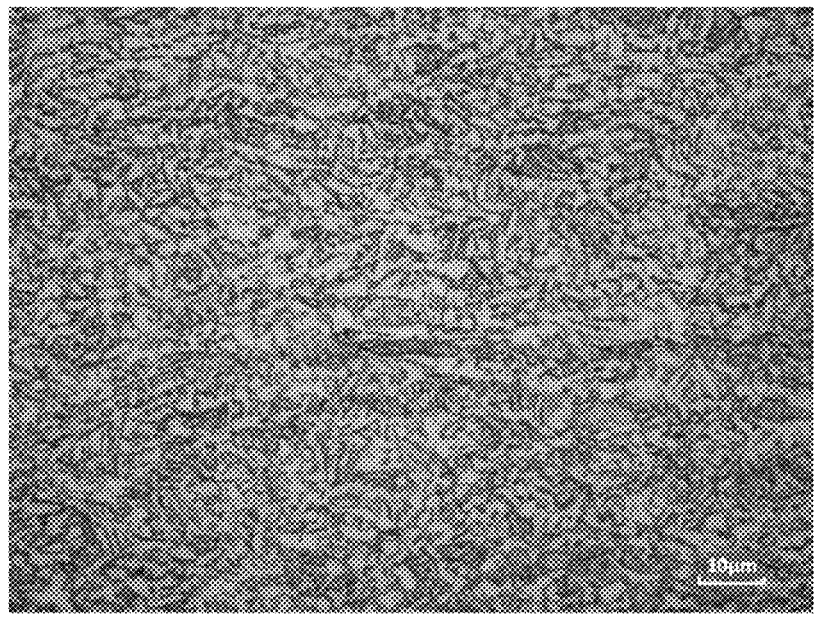
FIG. 11A is an optical microstructure photograph illustrating the L cross-section (after nital etching) of the electric resistance welded steel pipe obtained by changing the heat treatment conditions of Example 1 (heat treatment conditions: 300° C. and 300 seconds) to 200° C. and 300 seconds.
Figure 11B:
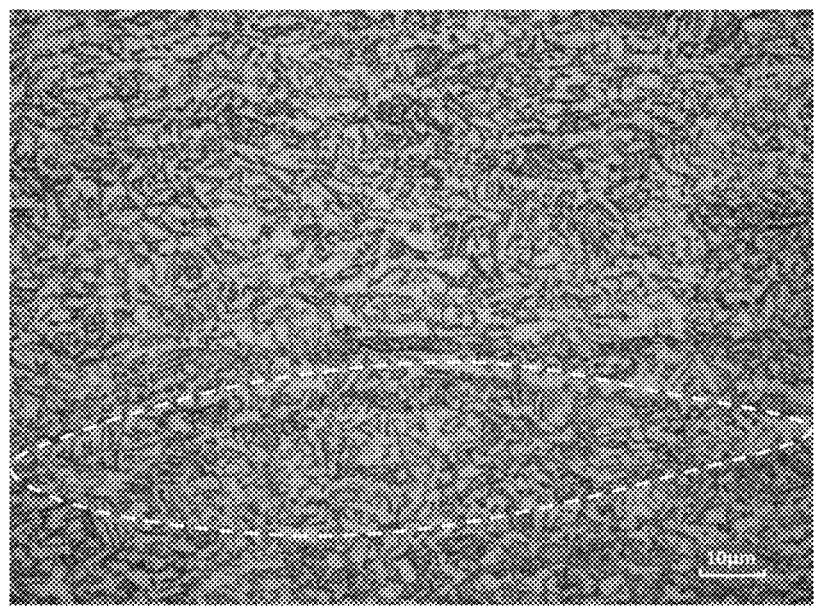
FIG. 11B is an optical microstructure photograph in which the grain boundary of a prior austenite grain is traced with a white broken line in the optical microstructure photograph illustrated in FIG. 11A.

FIG. 11A is an optical microstructure photograph illustrating the L cross-section (after nital etching) of the electric resistance welded steel pipe obtained by changing the heat treatment conditions of Example 1 (heat treatment conditions: 300° C. and 300 seconds) described later to 200° C. and 300 seconds, and FIG. 11B is an optical microstructure photograph in which the grain boundary of a prior austenite grain is traced with a white broken line in the optical microstructure photograph illustrated in FIG. 11A.

As illustrated in FIG. 11A and FIG. 11B, prior austenite grains having an aspect ratio of 1.5 or more are observed in the L cross-section of the electric resistance welded steel pipe.

As illustrated in FIG. 11A and FIG. 11B, the structure of the L cross-section of the electric resistance welded steel pipe is a bainite-based structure which partially contains ferrite (e.g., in grain boundary of prior austenite grain).

From the viewpoint of toughness, the electric resistance welded steel pipe of the embodiment preferably has a base metal toughness of 30 J or more at 0° C. in the circumferential direction of the pipe, determined by subjecting a full size specimen with a V-notch to a Charpy impact test. Hereinafter, this base metal toughness is referred to as "C-direction base metal toughness (0° C.)".

The Charpy impact test is in conformity with JIS Z2242 (2005), and is conducted under a temperature condition of 0° C. The average value of five test results is regarded as the C-direction base metal toughness (0° C.).

From the viewpoint of toughness, the C-direction base metal toughness (0° C.) is preferably 40 J or more, and more preferably 50 J or more.

From the viewpoint of toughness, the upper limit of the C-direction base metal toughness (0° C.) is not particularly restricted. From the viewpoint of satisfying both toughness and strength (for example, tensile strength), the C-direction base metal toughness (0° C.) is preferably 200 J or less, more preferably 180 J or less, and still more preferably 130 J or less.

The wall thickness of the electric resistance welded steel pipe of the embodiment is not particularly restricted. The wall thickness is preferably from 5 mm to 17 mm, more preferably from 7 mm to 15 mm, and particularly preferably from 9 mm to 13 mm. A wall thickness of 5 mm or more is advantageous from the viewpoint of improving a collapse strength. A wall thickness of 17 mm or less is advantageous from the viewpoint of reducing a material cost.

In the electric resistance welded steel pipe of the embodiment, the ratio [D/t] of an outer diameter (D) to a wall thickness (t) is not particularly restricted. The ratio [D/t] is preferably from 10.0 to 25.0, more preferably from 13.0 to 23.0, and particularly preferably from 15.0 to 21.0. A ratio [D/t] of 10.0 or more is advantageous from the viewpoint of reducing a material cost. A ratio [D/t] of 25.0 or less is advantageous from the viewpoint of improving a collapse strength.

A method for producing the electric resistance welded steel pipe of the embodiment is not particularly restricted. The electric resistance welded steel pipe can be produced by a common method for producing an electric resistance welded steel pipe.

A preferred method for producing the electric resistance welded steel pipe of the embodiment (hereinafter also referred to as "production method A") is a production method including:

a hot-rolling step of hot-rolling a slab, cooling the slab to thereby make a steel plate, and coiling up the obtained steel plate to obtain a coil;

a pipe-making step of uncoiling the steel plate from the coil, forming the unwound steel plate in a cylindrical shape (tubular shape), electric resistance welding abutting surfaces after the formation of the cylindrical shape, thereby making an electric resistance welded steel pipe, and subjecting the obtained electric resistance welded steel pipe to sizing (diameter reduction working); and a heat treatment step of subjecting the electric resistance welded steel pipe, which has been subjected to the sizing, to heat treatment.

In the production method A, an average cooling rate during the cooling in the hot-rolling step is preferably 20° C./s or more from the viewpoint of obtaining high YR. The upper limit of the average cooling rate is, for example, 60° C., and preferably 50° C.

In the production method A, a coiling temperature during the coiling in the hot-rolling step is preferably 100° C. or less from the viewpoint of obtaining high YR. The lower limit of the coiling temperature is, for example, 5° C., and preferably 10° C.

In the production method A, the strain amount of the sizing (sizing strain amount) in the pipe-making step is preferably 2.0% or more from the viewpoint of obtaining high YR. The upper limit of the sizing strain amount is, for example, 5.0%, and preferably 4.0%.

In the production method A, the temperature of the heat treatment (heat treatment temperature) in the heat treatment step is preferably from 200° C. to 400° C. A heat treatment temperature of 200° C. or more results in reduction in residual stress, thereby enhancing the collapse strength ratio. A heat treatment temperature of 400° C. or less results in increase in strength (for example, tensile strength).

In the production method A, the time of the heat treatment (heat treatment time) in the heat treatment step is preferably from 3 seconds to 600 seconds. A heat treatment time of 3 seconds or more results in reduction in residual stress, thereby enhancing the collapse strength ratio. A heat treatment time of 600 seconds or less results in increase in strength (for example, tensile strength).

From the viewpoint of productivity, the heat treatment is particularly preferably performed in IH (induction heating).

EXAMPLES

The embodiment will be still more specifically described by way of Examples, provided that the embodiment is not limited to the following Examples.

Examples 1 to 14, and Comparative Examples 1 to 22

Each of electric resistance welded steel pipes of Examples 1 to 14, and Comparative Examples 1 to 22, having components set forth in Table 1, Pcm values set forth in Table 1, an outer diameter (D) of 200 mm, and a wall thickness (t) of 11 mm, was produced. In the electric resistance welded steel pipes, components (remainder) other than the components set forth in Table 1 were Fe and unavoidable impurities.

The electric resistance welded steel pipes of Examples 1 to 14, and Comparative Examples 1 to 7, and 9 to 22 were produced by the production method A.

The electric resistance welded steel pipe of Comparative Example 8 was produced by the same method as the production method A except that the heat treatment step was not performed.

In each example, an average cooling rate in the hot-rolling step, a coiling temperature (temperature at the end of the cooling; hereinafter also referred to as CT (cooling temperature)) in hot-rolling step, a sizing strain amount in the pipe-making step, a heat treatment temperature in the heat treatment step, and a heat treatment time in the heat treatment step are as set forth in Table 2.

The average cooling rate in the hot-rolling step was determined based on the difference between the temperature of the steel plate at the end of the hot rolling and the coiling temperature (CT).

The condition of the cooling after the heat treatment in each of Examples 1 to 14, and Comparative Examples 1 to 7, and 9 to 22 was cooling to room temperature at an average cooling rate of 40° C./s.

The following properties of each of the obtained electric resistance welded steel pipes were measured.

The results are set forth in Table 2.

<Tensile Strength, Ratio [0.2% Proof Stress/Tensile Strength] (YR), and Ratio [2% Flow Stress/Tensile Strength]>

From the obtained electric resistance welded steel pipe, No. 12 specimen (arc-shaped specimen) was sampled as full thickness specimen. The full thickness specimen was sampled in a direction where the tensile direction in a tensile test corresponds to a pipe axis direction (L-direction), from the base metal 90° position of the electric resistance welded steel pipe (position deviating at 90° in the circumferential direction of the pipe with respect to an electric resistance welded portion). The sampled full thickness specimen was subjected to the tensile test (pipe axis direction tensile test), in which the tensile direction corresponds to the pipe axis direction, in conformity with JIS Z2241 (2011), to measure each of the tensile strength (MPa), ratio [0.2% proof stress/tensile strength] (YR), and ratio [2% flow stress/tensile strength] of the full thickness specimen.

<Residual Stress>

The residual stress (MPa) of the obtained electric resistance welded steel pipe was measured by a Crampton method.

<Average Positron Lifetime>

The average positron lifetime (ps) of the obtained electric resistance welded steel pipe was measured by a positron annihilation method. The details of the measurement method are as described above.

<Percentage of Prior γ-Grain Having Aspect Ratio of 1.5 or More>

A sample piece for observing an L cross-section was sampled from the obtained electric resistance welded steel pipe, the evaluation surface of the sampled specimen (L cross-section of electric resistance welded steel pipe) was nital-etched, and the nital-etched evaluation surface was observed with an optical microscope to obtain an optical microstructure photograph (see, for example, FIG. 10A, FIG. 10B, FIG. 11A, and FIG. 11B). From the obtained optical microstructure photograph, the aspect ratio of prior austenite grain (prior γ-grain) was determined.

In such a manner, the aspect ratios of 30 prior γ-grains in each electric resistance welded steel pipe were determined. From the obtained results, the percentage (% (% in terms of the number)) of prior γ-grains having an aspect ratio of 1.5 or more to 30 prior γ-grains was determined.

<C-Direction Base Metal Toughness (0° C.)>

From the obtained electric resistance welded steel pipe, a full size specimen with a V-notch (specimen for Charpy impact test) was sampled. The full size specimen with a V-notch was sampled such that the test direction corresponded to the circumferential direction of the pipe (C-direction). The sampled full size specimen with a V-notch was subjected to a Charpy impact test in conformity of JIS Z2242 (2005) under a temperature condition of 0° C., to measure a Charpy absorbed energy (J) in the circumferential direction of the pipe.

The above measurement was performed five times for each electric resistance welded steel pipe, and the average value of the five Charpy absorbed energies (J) was regarded as a C-direction base metal toughness (0° C.) (J).

<Collapse Strength Ratio>

The respective collapse strengths of the electric resistance welded steel pipe after the pipe-making step and before the heat treatment step, and the electric resistance welded steel pipe after the heat treatment step, were measured in conformity with "2.3 Collapse Testing Procedure" in API BULLETIN 5C3.

Based on the obtained results, the collapse strength ratio, i.e., a ratio [collapse strength of electric resistance welded steel pipe after heat treatment/collapse strength of electric resistance welded steel pipe before heat treatment]) was determined.

TABLE 1

| | Component (%) | | | | | | | | | |
|---|---|---|---|---|---|---|---|---|---|---|
| | C | Si | Mn | P | S | Nb | Ti | Al | N | Ca |
| Example 1 | 0.10 | 0.30 | 1.5 | 0.010 | 0.002 | 0.030 | 0.020 | 0.030 | 0.0040 | |
| Example 2 | 0.10 | 0.30 | 1.5 | 0.010 | 0.002 | 0.030 | 0.020 | 0.030 | 0.0040 | |
| Example 3 | 0.10 | 0.30 | 1.5 | 0.010 | 0.002 | 0.030 | 0.020 | 0.030 | 0.0030 | 0.0035 |
| Example 4 | 0.10 | 0.30 | 1.5 | 0.010 | 0.002 | 0.030 | 0.020 | 0.030 | 0.0030 | 0.0030 |
| Example 5 | 0.10 | 0.30 | 1.5 | 0.010 | 0.002 | 0.030 | 0.020 | 0.030 | 0.0040 | 0.0032 |
| Example 6 | 0.10 | 0.30 | 1.5 | 0.010 | 0.002 | 0.030 | 0.020 | 0.030 | 0.0050 | 0.0034 |
| Example 7 | 0.02 | 0.25 | 1.5 | 0.010 | 0.010 | 0.040 | 0.015 | 0.040 | 0.0040 | 0.0030 |
| Example 8 | 0.14 | 0.30 | 1.3 | 0.010 | 0.002 | 0.050 | 0.030 | 0.070 | 0.0020 | 0.0035 |
| Example 9 | 0.08 | 0.05 | 1.0 | 0.020 | 0.002 | 0.010 | 0.010 | 0.010 | 0.0040 | |
| Example 10 | 0.09 | 0.50 | 2.1 | 0.010 | 0.002 | 0.060 | 0.050 | 0.100 | 0.0040 | |
| Example 11 | 0.14 | 0.05 | 2.1 | 0.010 | 0.002 | 0.010 | 0.050 | 0.010 | 0.0030 | 0.0030 |
| Example 12 | 0.10 | 0.30 | 1.5 | 0.010 | 0.002 | 0.030 | 0.020 | 0.030 | 0.0050 | |
| Example 13 | 0.10 | 0.30 | 1.5 | 0.010 | 0.002 | 0.030 | 0.020 | 0.030 | 0.0060 | 0.0040 |
| Example 14 | 0.10 | 0.30 | 1.5 | 0.010 | 0.002 | 0.030 | 0.020 | 0.030 | 0.0040 | 0.0010 |
| Comparative Example 1 | 0.10 | 0.30 | 1.5 | 0.010 | 0.002 | 0.030 | 0.020 | 0.030 | 0.0040 | |
| Comparative Example 2 | 0.10 | 0.30 | 1.5 | 0.010 | 0.002 | 0.030 | 0.020 | 0.030 | 0.0040 | |
| Comparative Example 3 | 0.10 | 0.30 | 1.5 | 0.010 | 0.002 | 0.030 | 0.020 | 0.030 | 0.0040 | |
| Comparative Example 4 | 0.10 | 0.30 | 1.5 | 0.010 | 0.002 | 0.030 | 0.020 | 0.030 | 0.0040 | |

TABLE 1-continued

| | | | | | | | | | |
|---|---|---|---|---|---|---|---|---|---|
| Comparative Example 5 | 0.10 | 0.30 | 1.5 | 0.010 | 0.002 | 0.030 | 0.020 | 0.030 | 0.0040 |
| Comparative Example 6 | 0.10 | 0.30 | 1.5 | 0.010 | 0.002 | 0.030 | 0.020 | 0.030 | 0.0040 |
| Comparative Example 7 | 0.10 | 0.30 | 1.5 | 0.010 | 0.002 | 0.030 | 0.020 | 0.030 | 0.0040 |
| Comparative Example 8 | 0.10 | 0.30 | 1.5 | 0.010 | 0.002 | 0.030 | 0.020 | 0.030 | 0.0040 |
| Comparative Example 9 | 0.01 | 0.30 | 1.5 | 0.010 | 0.002 | 0.030 | 0.020 | 0.030 | 0.0030 |
| Comparative Example 10 | 0.15 | 0.30 | 1.5 | 0.010 | 0.002 | 0.030 | 0.020 | 0.030 | 0.0040 |
| Comparative Example 11 | 0.10 | 0.04 | 1.5 | 0.010 | 0.002 | 0.030 | 0.020 | 0.030 | 0.0020 |
| Comparative Example 12 | 0.10 | 0.53 | 1.5 | 0.010 | 0.002 | 0.030 | 0.020 | 0.030 | 0.0040 |
| Comparative Example 13 | 0.10 | 0.30 | 0.9 | 0.010 | 0.002 | 0.030 | 0.020 | 0.030 | 0.0040 |
| Comparative Example 14 | 0.10 | 0.30 | 2.2 | 0.010 | 0.002 | 0.030 | 0.020 | 0.030 | 0.0040 |
| Comparative Example 15 | 0.10 | 0.30 | 1.5 | 0.025 | 0.002 | 0.030 | 0.020 | 0.030 | 0.0030 |
| Comparative Example 16 | 0.10 | 0.30 | 1.5 | 0.010 | 0.011 | 0.030 | 0.020 | 0.030 | 0.0050 |
| Comparative Example 17 | 0.10 | 0.30 | 1.5 | 0.010 | 0.002 | 0.009 | 0.020 | 0.030 | 0.0040 |
| Comparative Example 18 | 0.10 | 0.30 | 1.5 | 0.010 | 0.002 | 0.110 | 0.020 | 0.030 | 0.0050 |
| Comparative Example 19 | 0.10 | 0.30 | 1.5 | 0.010 | 0.002 | 0.030 | 0.009 | 0.030 | 0.0040 |
| Comparative Example 20 | 0.10 | 0.30 | 1.5 | 0.010 | 0.002 | 0.030 | 0.060 | 0.030 | 0.0030 |
| Comparative Example 21 | 0.10 | 0.30 | 1.5 | 0.010 | 0.002 | 0.030 | 0.020 | 0.009 | 0.0040 |
| Comparative Example 22 | 0.10 | 0.30 | 1.5 | 0.010 | 0.002 | 0.030 | 0.020 | 0.110 | 0.0040 |

| | Component (%) | | | | | | | Pcm |
|---|---|---|---|---|---|---|---|---|
| | Mo | V | Cr | Ni | Cu | B | Ce | |
| Example 1 | | | | | | | | 0.1850 |
| Example 2 | | | | | | | | 0.1850 |
| Example 3 | | | | 0.10 | | | | 0.1867 |
| Example 4 | | | | | | | | 0.1850 |
| Example 5 | | | | | | | | 0.1850 |
| Example 6 | | | | 0.30 | | | | 0.1900 |
| Example 7 | 0.30 | | | 0.50 | 0.50 | 0.50 | 0.0030 | 0.1967 |
| Example 8 | | 0.05 | | | | | | 0.2200 |
| Example 9 | 0.20 | | 0.30 | 0.50 | 0.50 | | | 0.1933 |
| Example 10 | 0.10 | | | | | 0.0020 | | 0.2283 |
| Example 11 | | | | 0.20 | | | 0.0040 | 0.2500 |
| Example 12 | 0.15 | 0.03 | | | 0.10 | | | 0.2030 |
| Example 13 | | | 0.03 | | | | 0.0010 | 0.1865 |
| Example 14 | | | | | | 0.0010 | 0.0030 | 0.1900 |
| Comparative Example 1 | | | | | | | | 0.1850 |
| Comparative Example 2 | | | | | | | | 0.1850 |
| Comparative Example 3 | | | | | | | | 0.1850 |
| Comparative Example 4 | | | | | | | | 0.1850 |
| Comparative Example 5 | | | | | | | | 0.1850 |
| Comparative Example 6 | | | | | | | | 0.1850 |
| Comparative Example 7 | | | | | | | | 0.1850 |
| Comparative Example 8 | | | | | | | | 0.1850 |
| Comparative Example 9 | | | | | | | | 0.0950 |
| Comparative Example 10 | | | | | | | | 0.2350 |
| Comparative Example 11 | | | | | | | | 0.1763 |
| Comparative Example 12 | | | | | | | | 0.1927 |

TABLE 1-continued

| | |
|---|---|
| Comparative Example 13 | 0.1550 |
| Comparative Example 14 | 0.2200 |
| Comparative Example 15 | 0.1850 |
| Comparative Example 16 | 0.1850 |
| Comparative Example 17 | 0.1850 |
| Comparative Example 18 | 0.1850 |
| Comparative Example 19 | 0.1850 |
| Comparative Example 20 | 0.1850 |
| Comparative Example 21 | 0.1850 |
| Comparative Example 22 | 0.1850 |

TABLE 2

| | Hot-rolling step | | Pipe-making step | Heat treatment step | | Properties | |
|---|---|---|---|---|---|---|---|
| | Average cooling rate (° C./s) | CT (° C.) | Sizing strain amount (%) | Heat treatment temperature (° C.) | Heat treatment time (s) | Tensile strength (MPa) | Ratio [0.2% proof stress/tensile strength] |
| Example 1 | 30 | RT | 3.0 | 300 | 300 | 900 | 0.90 |
| Example 2 | 20 | RT | 2.5 | 250 | 600 | 850 | 0.89 |
| Example 3 | 30 | 100 | 4.0 | 300 | 100 | 900 | 0.83 |
| Example 4 | 50 | RT | 2.0 | 370 | 300 | 950 | 0.86 |
| Example 5 | 35 | 70 | 2.7 | 400 | 3 | 910 | 0.82 |
| Example 6 | 30 | RT | 3.0 | 200 | 70 | 920 | 0.82 |
| Example 7 | 30 | RT | 3.0 | 300 | 300 | 780 | 0.81 |
| Example 8 | 30 | RT | 3.0 | 300 | 300 | 1010 | 0.85 |
| Example 9 | 30 | RT | 3.0 | 300 | 300 | 790 | 0.83 |
| Example 10 | 30 | RT | 3.0 | 300 | 300 | 1020 | 0.86 |
| Example 11 | 30 | RT | 3.0 | 300 | 300 | 1050 | 0.90 |
| Example 12 | 30 | RT | 3.0 | 300 | 300 | 950 | 0.91 |
| Example 13 | 30 | RT | 3.0 | 300 | 300 | 910 | 0.90 |
| Example 14 | 30 | RT | 3.0 | 300 | 300 | 1000 | 0.92 |
| Comparative Example 1 | 18 | RT | 3.0 | 300 | 300 | 790 | 0.78 |
| Comparative Example 2 | 30 | 250 | 3.0 | 300 | 300 | 860 | 0.75 |
| Comparative Example 3 | 30 | RT | 1.8 | 300 | 300 | 880 | 0.78 |
| Comparative Example 4 | 30 | RT | 3.0 | 180 | 300 | 910 | 0.75 |
| Comparative Example 5 | 30 | RT | 3.0 | 405 | 300 | 770 | 0.78 |
| Comparative Example 6 | 30 | RT | 3.0 | 300 | 2 | 920 | 0.74 |
| Comparative Example 7 | 30 | RT | 3.0 | 300 | 610 | 760 | 0.78 |
| Comparative Example 8 | 30 | RT | 3.0 | No heat treatment | | 880 | 0.72 |
| Comparative Example 9 | 30 | RT | 3.0 | 300 | 300 | 750 | 0.81 |
| Comparative Example 10 | 30 | RT | 3.0 | 300 | 300 | 1100 | 0.92 |
| Comparative Example 11 | 30 | RT | 3.0 | 300 | 300 | — | — |
| Comparative Example 12 | 30 | RT | 3.0 | 300 | 300 | — | — |
| Comparative Example 13 | 30 | RT | 3.0 | 300 | 300 | 760 | 0.89 |
| Comparative Example 14 | 30 | RT | 3.0 | 300 | 300 | 1110 | 0.91 |
| Comparative Example 15 | 30 | RT | 3.0 | 300 | 300 | 910 | 0.92 |
| Comparative Example 16 | 30 | RT | 3.0 | 300 | 300 | 890 | 0.90 |

TABLE 2-continued

| | | | | | | | |
|---|---|---|---|---|---|---|---|
| Comparative Example 17 | 30 | RT | 3.0 | 300 | 300 | 870 | 0.88 |
| Comparative Example 18 | 30 | RT | 3.0 | 300 | 300 | 940 | 0.87 |
| Comparative Example 19 | 30 | RT | 3.0 | 300 | 300 | 880 | 0.89 |
| Comparative Example 20 | 30 | RT | 3.0 | 300 | 300 | 970 | 0.90 |
| Comparative Example 21 | 30 | RT | 3.0 | 300 | 300 | 890 | 0.91 |
| Comparative Example 22 | 30 | RT | 3.0 | 300 | 300 | 910 | 0.91 |

| | Properties | | | | | |
|---|---|---|---|---|---|---|
| | Ratio [2% flow stress/tensile strength] | Residual stress (MPa) | Average positron lifetime (ps) | Percentage (%) of prior γ-grains having aspect ratio of 1.5 or more | C-direction base metal toughness (0° C.) (J) | Collapse strength ratio |
| Example 1 | 0.92 | 200 | 135 | 70 | 100 | 1.20 |
| Example 2 | 0.91 | 200 | 132 | 55 | 120 | 1.19 |
| Example 3 | 0.90 | 290 | 139 | 70 | 100 | 1.12 |
| Example 4 | 0.91 | 170 | 123 | 85 | 80 | 1.19 |
| Example 5 | 0.88 | 290 | 135 | 75 | 95 | 1.11 |
| Example 6 | 0.93 | 280 | 138 | 70 | 90 | 1.11 |
| Example 7 | 0.92 | 160 | 139 | 70 | 180 | 1.13 |
| Example 8 | 0.92 | 250 | 136 | 70 | 40 | 1.12 |
| Example 9 | 0.92 | 180 | 137 | 70 | 130 | 1.14 |
| Example 10 | 0.92 | 260 | 136 | 70 | 50 | 1.12 |
| Example 11 | 0.92 | 290 | 135 | 70 | 30 | 1.11 |
| Example 12 | 0.92 | 220 | 132 | 70 | 80 | 1.19 |
| Example 13 | 0.92 | 200 | 135 | 70 | 120 | 1.20 |
| Example 14 | 0.94 | 240 | 128 | 70 | 110 | 1.20 |
| Comparative Example 1 | 0.92 | 200 | 142 | 40 | 150 | 1.05 |
| Comparative Example 2 | 0.92 | 190 | 143 | 70 | 110 | 1.01 |
| Comparative Example 3 | 0.92 | 150 | 141 | 70 | 100 | 1.03 |
| Comparative Example 4 | 0.99 | 310 | 142 | 70 | 95 | 1.00 |
| Comparative Example 5 | 0.82 | 140 | 127 | 70 | 130 | 1.08 |
| Comparative Example 6 | 0.99 | 320 | 143 | 70 | 90 | 1.00 |
| Comparative Example 7 | 0.83 | 150 | 128 | 70 | 120 | 1.09 |
| Comparative Example 8 | 0.99 | 350 | 143 | 70 | 90 | 1.00 |
| Comparative Example 9 | 0.88 | 150 | 138 | 70 | 140 | 1.19 |
| Comparative Example 10 | 0.94 | 290 | 129 | 70 | 25 | 1.19 |
| Comparative Example 11 | 0.92 | — | — | 70 | — | Impossible to produce |
| Comparative Example 12 | 0.92 | — | — | 70 | — | Impossible to produce |
| Comparative Example 13 | 0.92 | 150 | 135 | 70 | 150 | 1.19 |
| Comparative Example 14 | 0.92 | 300 | 135 | 70 | 20 | 1.19 |
| Comparative Example 15 | 0.94 | 205 | 132 | 70 | 25 | 1.19 |
| Comparative Example 16 | 0.92 | 195 | 135 | 70 | 25 | 1.19 |
| Comparative Example 17 | 0.92 | 180 | 136 | 70 | 25 | 1.19 |
| Comparative Example 18 | 0.92 | 220 | 138 | 70 | 25 | 1.19 |
| Comparative Example 19 | 0.92 | 190 | 135 | 70 | 25 | 1.19 |
| Comparative Example 20 | 0.92 | 260 | 135 | 70 | 20 | 1.19 |
| Comparative Example 21 | 0.93 | 195 | 135 | 70 | 25 | 1.19 |
| Comparative Example 22 | 0.93 | 205 | 135 | 70 | 20 | 1.19 |

In Table 1, Pcm (%) shows a weld crack sensitivity composition defined by the above-described Formula (1).

In Table 2, CT shows a coiling temperature, and RT shows a room temperature.

In Table 1 and Table 2, the underlined numerical values show numerical values that fall outside the scope of the embodiment.

As set forth in Table 1 and Table 2, the electric resistance welded steel pipes of Examples 1 to 14, containing in terms of mass %: 0.02 to 0.14% of C, 0.05 to 0.50% of Si, 1.0 to 2.1% of Mn, 0.020% or less of P, 0.010% or less of S, 0.010 to 0.100% of Nb, 0.010 to 0.050% of Ti, 0.010 to 0.100% of Al, and 0.0100% or less of N, wherein the contents of Cu, Ni, Cr, Mo, V, and B were 0 to 0.50% of Cu, 0 to 1.00% of Ni, 0 to 0.50% of Cr, 0 to 0.30% of Mo, 0 to 0.10% of V, and 0 to 0.0030% of B, respectively, a remainder consisting of Fe and unavoidable impurities, and wherein a tensile strength was 780 MPa or more, a ratio [0.2% proof stress/tensile strength] was 0.80 or more, and a ratio [2% flow stress/tensile strength] was from 0.85 to 0.98, had the collapse strength ratio (ratio [collapse strength of electric resistance welded steel pipe after heat treatment/collapse strength of electric resistance welded steel pipe before heat treatment]) of 1.10 or more, and were improved in collapse strength by the heat treatment after pipe making. Furthermore, the electric resistance welded steel pipes of Examples 1 to 14 had a C-direction base metal toughness (0° C.) of 30 J or more, and had toughness demanded for an oil well pipe.

In contrast to Examples 1 to 14, the electric resistance welded steel pipes of Comparative Examples 1 to 8 having a ratio [0.2% proof stress/tensile strength] of less than 0.80 (among them, in particular, the electric resistance welded steel pipes of Comparative Examples 4, 6, and 8 having a ratio [2% flow stress/tensile strength] of more than 0.98) had low collapse strength ratios.

Each of the electric resistance welded steel pipes of Comparative Examples 5 and 7 having a ratio [2% flow stress/tensile strength] of less than 0.85, the electric resistance welded steel pipe of Comparative Example 9 having a C content of less than 0.02%, and the electric resistance welded steel pipe of Comparative Example 13 having a Mn content of less than 1.0% had a tensile strength of less than 780 MPa, and had an insufficient strength for an oil well pipe.

The electric resistance welded steel pipes of Comparative Examples 10, and 14 to 22, in which the chemical compositions fell outside the scope of the embodiment (see Table 1 for details), had a C-direction base metal toughness (0° C.) of less than 30 J, and had an insufficient toughness for an oil well pipe.

In Comparative Examples 11 and 12, in which the Si contents were not in a range of from 0.05 to 0.50%, oxide defects frequently occurred in the electric resistance welded portions, and it was impossible to produce electric resistance welded steel pipes that were able to endure use for an oil well pipe.

The entire disclosure of Japanese Patent Application No. 2013-267314 is incorporated herein by reference.

All documents, patent applications, and technical standards described in this specification are herein incorporated by reference to the same extent as if each individual document, patent application, or technical standard was specifically and individually indicated to be incorporated by reference.

The invention claimed is:

1. An electric resistance welded steel pipe for an oil well, comprising, in terms of mass %:
    0.02 to 0.14% of C,
    0.05 to 0.50% of Si,
    1.0 to 2.1% of Mn,
    0.020% or less of P,
    0.010% or less of S,
    0.010 to 0.100% of Nb,
    0.010 to 0.050% of Ti,
    0.010 to 0.100% of Al, and
    0.0100% or less of N,
    wherein contents of Cu, Ni, Cr, Mo, V, B, Ca and Ce are:
    0 to 0.50% of Cu,
    0 to 1.00% of Ni,
    0 to 0.50% of Cr,
    0 to 0.30% of Mo,
    0 to 0.10% of V,
    0 to 0.0030% of B,
    0 to 0.0050% of Ca, and
    0 to 0.0050% of Ce respectively,
    a remainder consisting of Fe and unavoidable impurities,
    and wherein, in a pipe axis direction tensile test with a full thickness specimen, a tensile strength is 780 MPa or more, a ratio of a 0.2% proof stress to the tensile strength [0.2% proof stress/tensile strength] is 0.80 or more, and a ratio of a 2% flow stress to the tensile strength [2% flow stress/tensile strength] is from 0.85 to 0.98.

2. The electric resistance welded steel pipe for an oil well according to claim 1, comprising, in terms of mass %, one or more of:
    more than 0 but equal to or less than 0.0050% of Ca,
    more than 0 but equal to or less than 0.30% of Mo,
    more than 0 but equal to or less than 0.10% of V,
    more than 0 but equal to or less than 0.50% of Cr,
    more than 0 but equal to or less than 1.00% of Ni,
    more than 0 but equal to or less than 0.50% of Cu,
    more than 0 but equal to or less than 0.0030% of B, and
    more than 0 but equal to or less than 0.0050% of Ce.

3. The electric resistance welded steel pipe for an oil well according to claim 1, wherein a residual stress measured by a Crampton method is 300 MPa or less.

4. The electric resistance welded steel pipe for an oil well according to claim 1, wherein a weld crack sensitivity composition Pcm defined by the following Formula (1) is 0.1800 or more:

$$Pcm = C + Si/30 + Mn/20 + Cu/20 + Ni/60 + Cr/20 + Mo/15 + V/10 + 5B \qquad \text{Formula (1):}$$

wherein, in Formula (1), each of C, Si, Mn, Cu, Ni, Cr, Mo, V, and B shows a content (mass %) of each element.

5. The electric resistance welded steel pipe for an oil well according to claim 1, wherein an average positron lifetime measured by a positron annihilation method is from 120 ps to 140 ps.

6. The electric resistance welded steel pipe for an oil well according to claim 1, wherein 50% or more of prior austenite grains observed in a cross section parallel to a pipe axis direction and a wall thickness direction are prior austenite grains having an aspect ratio of 1.5 or more.

7. The electric resistance welded steel pipe for an oil well according to claim 1, wherein a base metal toughness in a circumferential direction of the pipe, determined by subjecting a full size specimen with a V-notch to a Charpy impact test, is 30 J or more at 0° C.

8. The electric resistance welded steel pipe for an oil well according to claim 2, wherein a residual stress measured by a Crampton method is 300 MPa or less.

9. The electric resistance welded steel pipe for an oil well according to claim 2, wherein a weld crack sensitivity composition Pcm defined by the following Formula (1) is 0.1800 or more:

$$Pcm=C+Si/30+Mn/20+Cu/20+Ni/60+Cr/20+Mo/15+V/10+5B \quad \text{Formula (1):}$$

wherein, in Formula (1), each of C, Si, Mn, Cu, Ni, Cr, Mo, V, and B shows a content (mass %) of each element.

10. The electric resistance welded steel pipe for an oil well according to claim 2, wherein an average positron lifetime measured by a positron annihilation method is from 120 ps to 140 ps.

11. The electric resistance welded steel pipe for an oil well according to claim 2, wherein 50% or more of prior austenite grains observed in a cross section parallel to a pipe axis direction and a wall thickness direction are prior austenite grains having an aspect ratio of 1.5 or more.

12. The electric resistance welded steel pipe for an oil well according to claim 2, wherein a base metal toughness in a circumferential direction of the pipe, determined by subjecting a full size specimen with a V-notch to a Charpy impact test, is 30 J or more at 0° C.

13. The electric resistance welded steel pipe for an oil well according to claim 1, wherein the tensile strength is more than 780 MPa.

14. The electric resistance welded steel pipe for an oil well according to claim 1, wherein the tensile strength is 790 MPa or more.

15. The electric resistance welded steel pipe for an oil well according to claim 1, having a wall thickness of from 5 to 17 mm, wherein a ratio [D/t] of an outer diameter (D) to a wall thickness (t) is from 10.0 to 25.0.

16. An electric resistance welded steel pipe for an oil well, comprising, in terms of mass %:

0.02 to 0.14% of C,
0.05 to 0.50% of Si,
1.0 to 2.1% of Mn,
0.020% or less of P,
0.010% or less of S,
0.010 to 0.100% of Nb,
0.010 to 0.050% of Ti,
0.010 to 0.100% of Al, and
0.0100% or less of N,
wherein contents of Cu, Ni, Cr, Mo, V, B, Ca, and Ce are:
0 to 0.50% of Cu,
0 to 1.00% of Ni,
0 to 0.50% of Cr,
0 to 0.30% of Mo,
0 to 0.10% of V,
0 to 0.0030% of B,
0 to 0.0050% of Ca, and
0 to 0.0050% of Ce respectively,
a remainder comprising Fe and unavoidable impurities,
and wherein, in a pipe axis direction tensile test with a full thickness specimen, a tensile strength is 780 MPa or more, a ratio of a 0.2% proof stress to the tensile strength [0.2% proof stress/tensile strength] is 0.80 or more, and a ratio of a 2% flow stress to the tensile strength [2% flow stress/tensile strength] is from 0.85 to 0.98.

17. The electric resistance welded steel pipe for an oil well according to claim 16, wherein the tensile strength is more than 780 MPa.

18. The electric resistance welded steel pipe for an oil well according to claim 16, wherein the tensile strength is 790 MPa or more.

19. The electric resistance welded steel pipe for an oil well according to claim 16, having a wall thickness of from 5 to 17 mm, wherein a ratio [D/t] of an outer diameter (D) to a wall thickness (t) is from 10.0 to 25.0.

* * * * *